United States Patent
Nishikawa et al.

(10) Patent No.: US 6,507,411 B1
(45) Date of Patent: Jan. 14, 2003

(54) PRINTING CONTROL METHOD AND APPARATUS

(75) Inventors: Satoshi Nishikawa, Yokohama; Koji Nakagiri, Kawasaki; Yasuo Mori; Yasuhiro Kujirai, both of Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/348,561

(22) Filed: Jul. 7, 1999

(30) Foreign Application Priority Data

Oct. 7, 1998 (JP) .......................................... 10-196338

(51) Int. Cl.[7] ............................................. G06K 15/00
(52) U.S. Cl. ...................................... 358/1.2; 358/1.18
(58) Field of Search .................... 358/1.1, 1.2, 1.18, 358/540, 450, 528; 382/284, 297, 298

(56) References Cited

U.S. PATENT DOCUMENTS

| 4,073,510 A | * | 2/1978 | Scharlin | .................... 270/1.01 |
| 5,801,712 A | | 9/1998 | Kujirai | ........................ 345/471 |

FOREIGN PATENT DOCUMENTS

| JP | 2-60772 | 3/1990 |
| JP | 2-291012 | 11/1990 |
| JP | 4-029864 | 1/1992 |
| JP | 4-220366 | 8/1992 |
| JP | 4-340653 | 11/1992 |
| JP | 6-28117 | 2/1994 |
| JP | 6-305201 | 11/1994 |
| JP | 7-044336 | 2/1995 |
| JP | 7-044338 | 2/1995 |
| JP | 7-058941 | 3/1995 |
| JP | 7-256975 | 10/1995 |
| JP | 8-297547 | 11/1996 |
| JP | 9-054663 | 2/1997 |
| JP | 9-193500 | 7/1997 |
| JP | 9-330188 | 12/1997 |
| JP | 10-075329 | 3/1998 |
| JP | 10-161828 | 6/1998 |

OTHER PUBLICATIONS

Office Action dated Jul. 8, 2002 of Japanese Application No. 10-196338.

* cited by examiner

Primary Examiner—Arthur G. Evans
(74) Attorney, Agent, or Firm—Fitzpatrick, Cella, Harper & Scinto

(57) ABSTRACT

When an original image is to be printed as a poster composed of an array of 4×4 output images, an image is generated by enlarging the original image fourfold in the vertical and horizontal directions and dividing the enlarged image into 16 parts. These 16 partial images are output successively starting from the upper left or lower right of the 4×4 array, depending upon the designation. If there is a blank page, the blank page is output as is even if the printer possesses a blank-paper economizing function. Thus, when a poster printing function is used, the user designates the manner in which the enlarged image is divided up and the order in which the divided images are printed. Even if the printer is equipped with the blank-paper economizing function, normal printed results can be obtained merely by joining the output sheets together in the order that conforms to the manner in which the enlarged image was divided.

36 Claims, 18 Drawing Sheets

FIG. 8

```
DOCUMENT INFORMATION                                          [X]
  DOCUMENT NAME : Microsoft Word DOCUMENT 2
  OWNER :         satoshi
  NUMBER OF COPIES : 1

PRINTING FORMAT :          | PRINTING ORDER :
       ORDINARY PRINTING     |       BY COPY / FORWARD
       [grid]                |       [stacked pages 1,2,3]
                             | PRINTED SIDE : [::::] SINGLE SIDE

[ CLOSE(C) ]
```

FIG. 9

```
DOCUMENT INFORMATION                                          [X]
  DOCUMENT NAME : Microsoft Word DOCUMENT 2
  OWNER :         satoshi
  NUMBER OF COPIES : 1

PRINTING FORMAT :          | PRINTING ORDER :
       POSTER PRINTING       |       BY COPY / FORWARD
       [grid]                |       [stacked pages 1,2,3]
                             | PRINTED SIDE : [::::] SINGLE SIDE

[ CLOSE(C) ]
```

901

(10.1)

OUTPUT : 2 × 2 (10.2)

(11.1)

112-1
112-2
112-3
112-4

OUTPUT : 4 × 4 (11.2)

(12.1)

OUTPUT : 2 × 2, (12.2)
ENLARGEMENT SCALE 150%

(13.1)

OUTPUT : 1 × 2, (13.2)
LANDSCAPE

FIG. 14

| 1 | 2 | 3 |
|---|---|---|
| 4 | 5 | 6 |
| 7 | 8 | 9 |

RIGHTWARD FROM UPPER LEFT, AND FROM TOP TO BOTTOM

FIG. 15

| 9 | 8 | 7 |
|---|---|---|
| 6 | 5 | 4 |
| 3 | 2 | 1 |

LEFTWARD FROM LOWER RIGHT, AND FROM BOTTOM TO TOP

PRINTING CONTROL METHOD AND APPARATUS

BACKGROUND OF THE INVENTION

This invention relates to a printing control method and apparatus and, more particularly, to a printing control method and apparatus for printing an image upon enlarging the same.

Printers available in the art are equipped with a blank-paper economizing function and an enlarging and continuous printing function. This function may be called a poster printing function. The former function does not allow printing on pages of blank paper that do not possess an image. The latter function enlarges an image contained on one page of paper and prints the enlarged image on a plurality of sheets of paper upon first dividing up the enlarged image in such a manner that the enlarged image can be obtained by joining the plurality of sheets together. If the poster printing function is used, the user reconstructs the image by joining together the output sheets of paper in an order that conforms to the manner in which the image was divided.

Since the enlarging and continuous printing function is a function provided by a printer, a printer not having the enlarging and continuous printing function cannot perform printing using the poster printing function.

With the enlarging and continuous printing function, the order of output is decided by the printer and the sheets that have been output must be joined together in this order.

Further, in regard to enlarging an image in poster printing, the user specifies the image enlargement magnification directly as by a percentage. However, the user cannot specify the size of each area bearing a divided image or the manner in which these areas are to be arranged.

Furthermore, the progress of poster printing is indicated based upon the number of pages occupied by original images prior to their enlargement. When each page having a divided image after enlargement is output, therefore, there is no indication of how far printing has progressed.

In addition, when the poster printing function is used, there are instances where, depending upon the printer resolution, printing cannot be performed normally owing to limitations imposed by the graphic engine. There is no way for the user to know this beforehand.

SUMMARY OF THE INVENTION

Accordingly, an object of the present invention is to provide a printing control method and apparatus in which, by using a printer not having the enlarging and continuous printing function, the user can obtain the same printing result as the result obtained by a printer having the enlarging and continuous printing function.

Another object of the present invention is to provide a printing control method and apparatus which inactivate the blank-paper economizing function while the enlarging and continuous function is activated, because the blank-paper economizing function works to prevent from outputting blank pages produced as a result of enlarging and continuous printing function if the blank-paper economizing function is used in conjunction with the poster printing function.

Still another object of the present invention is to provide a printing control method and apparatus in which, when poster printing is performed, the user can specify the sizes of the areas bearing the divided images as well as the manner in which these areas are arranged.

A further object of the present invention is to provide a printing control method and apparatus that make it possible to display the progress of a poster printing operation.

Still another object of the present invention is to provide a printing control method and apparatus in which, when use is made of the poster printing function and a situation arises in which printing cannot be performed normally owing to limitations on the graphic engine, the user is notified of this in advance.

According to the present invention, the foregoing objects are attained by providing a printing control apparatus for printing an image by a printer, comprising: image data generating means for generating image data obtained by enlarging an original image to a designated size and dividing up the enlarged image of the designated size; and transmitting means for transmitting the image data resulting from division to the printer in a designated order.

The designated size preferably is designated by rate of enlargement of the original image.

The designated size preferably is designated by size of each divided image area and number of divided image areas.

The designated order preferably is an order in which the enlarged original image can be reconstructed by arranging image areas that have been divided and printed in the above-mentioned order.

In a preferred embodiment, the apparatus further comprises display means for displaying progress of output of the image data resulting from division.

In a preferred embodiment, the apparatus further comprises means for detecting a state in which the image data generating means cannot generate image data, and giving notification of this fact.

In a preferred embodiment, the state in which the image data generating means cannot generate image data is one in which enlargement of the original image to a size that cannot be handled by the image data generating means has been designated.

In a preferred embodiment, the printer has a function which inhibits printing on blank paper, wherein when the image generating means generates image data by enlarging an original image and dividing up the enlarged image, an instruction not to use the function which inhibits printing on blank paper is transmitted to the printer before the image data is transmitted to the printer by the transmitting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram showing an example of ordinary document information;

FIG. 9 is a diagram showing document information when poster printing has been set;

FIG. 14 is a diagram showing a forward layout of poster printing;

FIG. 15 is a diagram showing a reverse layout of poster printing;

DESCRIPTION OF THE PREFERRED EMBODIMENTS

Preferred embodiments to which the present invention is applied will now be described.

<Configuration of Printing System>

Figure 1:
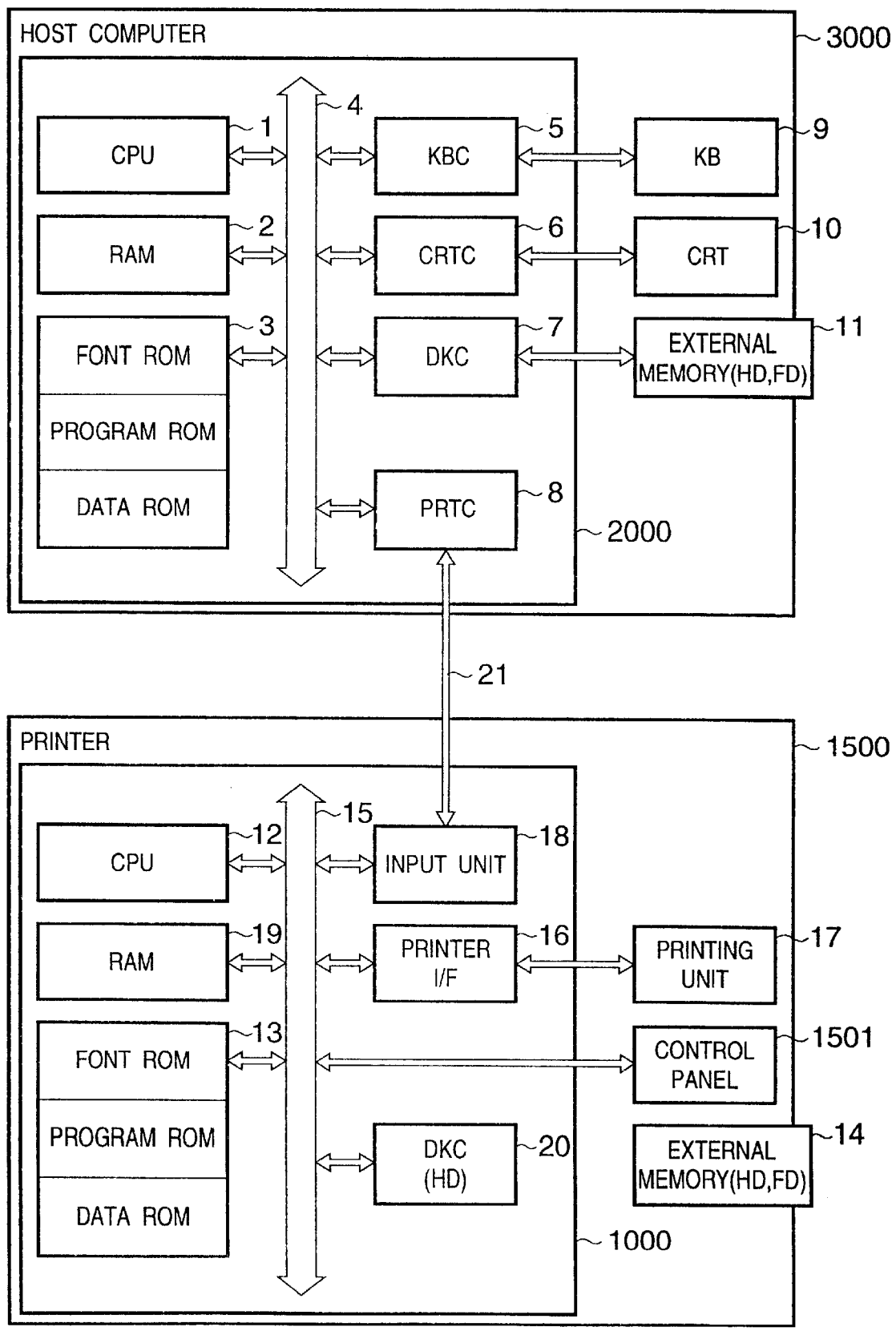
FIG. 1 is a block diagram of a printing control system embodying the present invention.

FIG. 1 is a block diagram showing a printer control system according to a first embodiment of the present invention. It should be noted that as long as the functions of the present invention are executed, the arrangement of the invention may be a stand-alone device, a system comprising a plurality of devices or a system in which processing is executed upon making a connection via a network such as a LAN or WAN.

The system shown in FIG. 1 includes a host computer 3000 having a CPU 1 which, on the basis of a programming ROM in a ROM 3 or a document processing program that has been stored in an external memory 11, executes the processing of a document containing mixed objects such as graphics, images, characters and tables (inclusive of spreadsheets, etc.). The CPU 1 performs overall control of various devices connected to a system bus. An operating system (OS) program, which is the control program of the CPU 1, and a printer driver, described later, are stored in a program ROM of the ROM 3 or in the external memory 11. Font data, etc. used when the above-mentioned document processing is executed is stored in a font ROM of the ROM 3 or in the external memory 11. Various data used when the above-mentioned document processing is executed is stored in a data ROM of the ROM 3 or in the external memory 11. The RAM 2 functions as the main memory and work area of the CPU 1.

A keyboard controller (KBC) 5 controls inputs from a keyboard 9 and pointing device, which is not shown. Various setting items involved in poster printing (described later) are included as input data. A CRT controller (CRTC) 6 controls the display on a CRT display (CRT) 10. A disk controller (DKC) 7 controls access to the external memory 11, such as a hard disk (HD) or floppy disk (FD), which stores a booting program, various applications, font data, user files, edited files and a program (referred to as a "printer driver" below) for generating printer control commands. A printer controller (PRTC) 8, which is connected to a printer 1500 via a bidirectional interface 21, executes processing for controlling communication with the printer 1500.

The CPU 1 executes processing to expand (rasterize) outline fonts in a RAM area, provided in, say, the RAM 2, that stores display information, and implements a WYSIWYG (What You See Is What You Get) function for displaying, on CRT 10, an image identical with the image printed. Further, on the basis of commands designated by a mouse cursor (not shown) on the CRT 10, the CPU 1 opens various windows that have been registered and executes a variety of data processing. When printing is executed, the user opens a window relating to printing settings, sets the printer and sets a printing processing method in regard to the printer driver, the setting including the selection of a printing mode.

The printer 1500 is controlled by a CPU 12. On the basis of a control program stored in a program ROM of a ROM 13 or a control program stored in an external memory 14, the printer CPU 12 outputs an image signal, which serves as output information, to a printing unit (printer engine) 17 connected to a system bus 15. A control program of the CPU 12 is stored in a program ROM of the ROM 13. Font data used when the above-mentioned output information is generated is stored in a font ROM of the ROM 13. In case of a printer not equipped with the external memory 14 such as a hard disk, information utilized in the host computer is stored in a data ROM of the ROM 13.

The CPU 12, which can execute processing for communicating with the host computer via an input unit 18, is capable of notifying the host computer 3000 of information internal to the printer 1500. A RAM 19, which functions as the main memory and work area of the CPU 12, is so adapted that memory capacity can be expanded by optional RAM connected to add-on memory, not shown. The RAM 19 is used as an area for expanding output information, as an area for storing environment data and as an NVRAM (non-volatile RAM). The external memory 14, such a hard disk (HD) or IC card, has its access controlled by a memory controller (MC) 20. The external memory 14, which is connected to the printer as an option, stores font data, an emulation program and form data, etc. Further, a control panel 1501 has an array of operation switches and LED indicators.

The external memory 14 is not limited to a single memory. A plurality of these memories can be provided and an arrangement may be adopted in which a plurality of optional cards storing optional fonts to supplement the internal fonts or a plurality of external memories storing programs for interpreting printer control languages of different language systems can be connected to the apparatus. Furthermore, the external memory 14 may have an NVRAM (not shown) for storing printer mode setting information from the control panel 1501.

Figure 2:
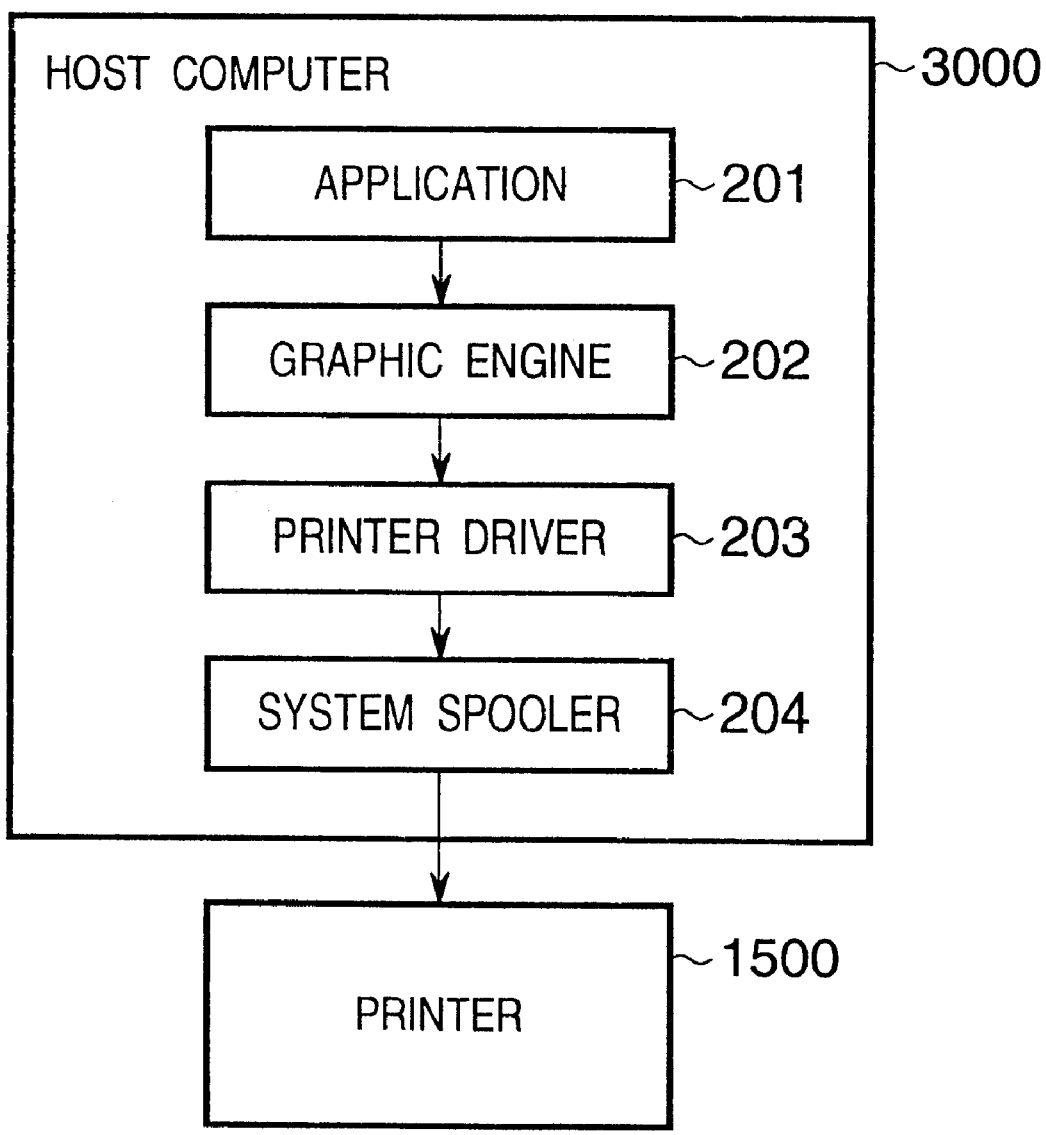
FIG. 2 is a block diagram of a typical printing system in which a printer is connected to a host computer.

FIG. 2 is a diagram showing typical printing processing executed by the host computer connected to a printing apparatus directly or via a network. An application 201, graphic engine 202, printer driver 203 and system spooler 204 are retained in the external memory 11 as files. These are program modules which, when they are to be executed, are loaded in the RAM 2 and executed by the operating system and by modules which utilize these modules. The application 201 and the printer driver 203 can be stored on a floppy disk or CD-ROM of the external memory 11 or can be stored on the hard disk of the external memory 11 via a network, not shown.

The application 201 stored in the external memory 11 can be executed upon being loaded in the RAM 2. When the application 201 performs printing using the printer 1500, output (drawing) is performed utilizing the graphic engine 202 capable of being executed upon being loaded in the RAM 2. The graphic engine 202 loads the printer driver 203, which is prepared for each printing apparatus, from the external memory 11 to the RAM 2 and converts the output from the application 201 to printer control commands using the printer driver 203. The printer control commands obtained by the conversion are output to the printer 1500 via the interface 21 by way of the system spooler 204 that has been loaded into the RAM 2 by the operating system.

Figure 3:
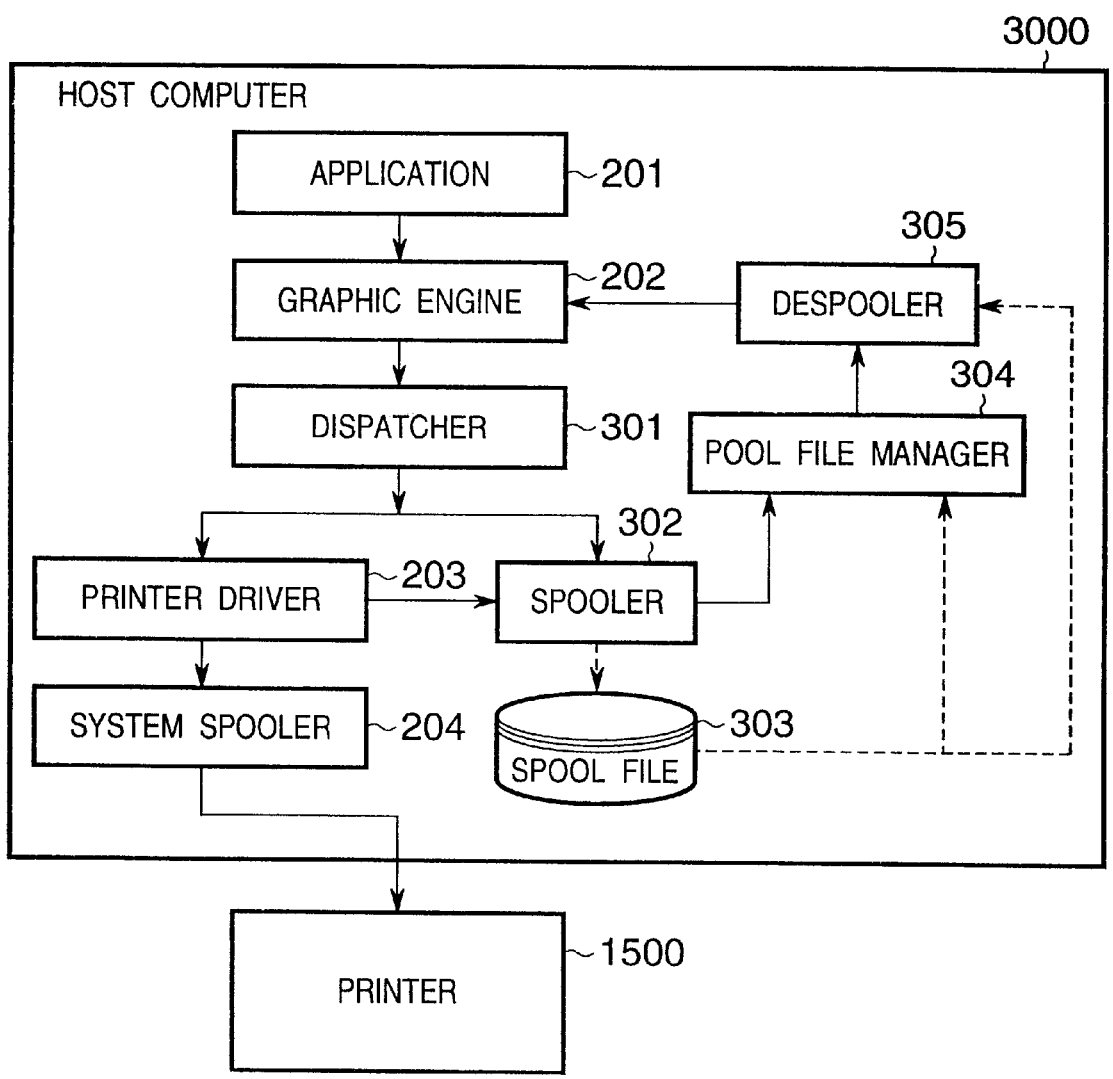
FIG. 3 is a block diagram of a printing system in which print instructions from an application are temporarily spooled as intermediate codes before being converted to printer command codes.

The printing system according to this embodiment has an arrangement which, as shown in FIG. 3, spools print data from the application temporarily in the form of intermediate code data. This arrangement is provided in addition to the system comprising the printer and host computer shown in FIG. 2.

FIG. 3 is an expansion of the system of FIG. 2. Here a spool file 303 comprising intermediate codes is generated temporarily when a print instruction is sent from the graphic engine 202 to the printer driver 203. In the system of FIG. 2, the application 201 is freed from printing processing at the moment the printer driver 203 finishes converting all print instructions from the graphic engine 202 to printer control commands. In the system of FIG. 3, on the other hand, the application 201 is freed from printing processing at the moment a spooler 302 converts all print instructions to intermediate code data and outputs the code data to a spool file 303. Ordinarily the latter requires a shorter period of time. Further, in the system shown in FIG. 3, the content of the spool file 303 can be manipulated. As a result, it is possible to realize functions not possessed by the application. For example, the print data from the application can be processed so that a plurality of pages may be printed upon being reduced to the size of a single page. Further, this makes it possible to implement an enlarged printing function (poster printing function).

In order to attain these objectives, the system of FIG. 2 is expanded in such a manner that print data is spooled in the form of intermediate codes as shown in FIG. 3. In order to manipulate the print data, the operator usually makes settings using a setting screen provided by the printer driver 203 and the printer driver 203 saves the set content in the RAM 2 or external memory 11.

The details of FIG. 3 will now be described. As illustrated in FIG. 3, the processing scheme thus expanded is such that print instructions from the graphic engine 202 are accepted by a dispatcher 301. In a case where a print instruction that the dispatcher 301 has accepted from the graphic engine 202 is a print instruction that the application 201 issued to the graphic engine 202, the dispatcher 301 loads the spooler 302, which has been stored in the external memory 11, into the RAM 2 and sends the print instruction to the spooler 302 and not the printer driver 203.

The spooler 302 converts the accepted print instruction to an intermediate code and outputs the code to a spool file 303. Further, the spooler 302 acquires the manipulation settings, which relate to print data set in the printer driver 203, from the printer driver 203 and preserves the data in the spool file 303. Though the spool file 303 is generated as a file in the external memory 11, the file may be generated in the RAM 2. Furthermore, the spooler 302 loads a spool file manager 304, which has been stored in the external memory 11, into the RAM 2 and notifies the spool file manager 304 of the status of spool file generation. In accordance with the content of the manipulation settings relating to the print data preserved in the spool file 303, the spool file manager 304 subsequently determines whether printing can be performed.

When the spool file manager 304 has judged that printing can be performed utilizing the graphic engine 202, the spool file manager 304 loads a despooler 305, which has been stored in the external memory 11, into the RAM 2 and instructs the despooler 305 to perform printing of the intermediate codes described in the spool file 303.

In accordance with the content of manipulation settings included in the spool file 303, the despooler 305 manipulates the intermediate codes contained in the spool file 303 and outputs them again via the graphic engine 202. At this time the spool file manager displays printing progress.

In a case where a print instruction which the dispatcher 301 receives from the graphic engine 202 is a print instruction sent from the despooler 305 to the graphic engine 202, the dispatcher 301 sends the print instruction to the printer driver 203 and not the spooler 302.

The printer driver 203 generates a print control command and outputs the command to the printer 1500 via the system spooler 204.

<Construction of Color Laser Printer>

Figure 23:
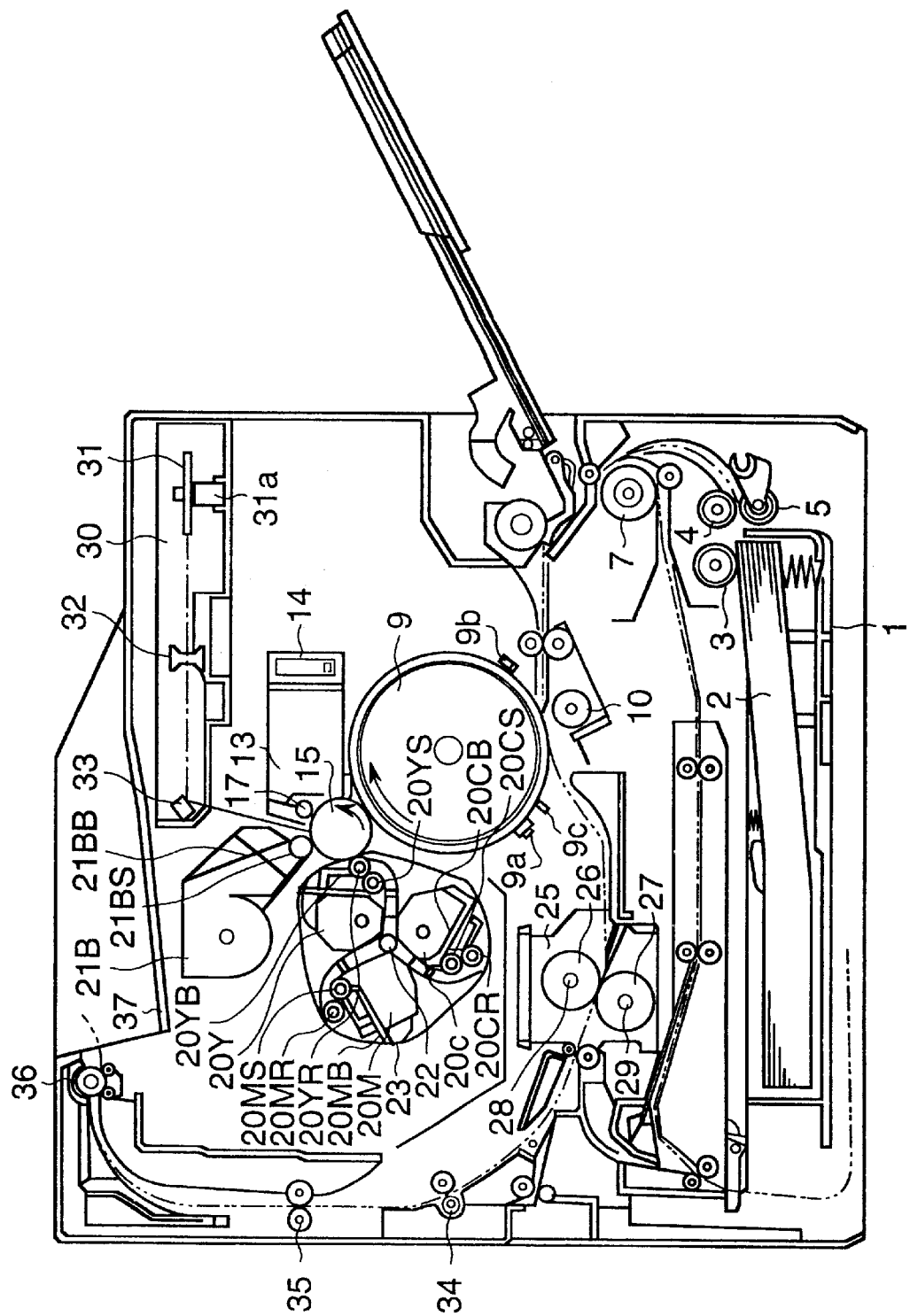
FIG. 23 is a sectional view showing a color laser printer.

FIG. 23 is a sectional view illustrating a color laser printer having a double-sided printing function and serving as one example of the printer 1500. The printer is so adapted that a laser beam, which has been modulated by image data of color components obtained based upon print data entered from the host computer 3000, is reflected by a rotating polygon mirror 31 so that a photosensitive drum 15 is scanned by the reflected laser beam to form electrostatic latent images. Visible images are obtained by developing the latent images using toner and the visible images for all colors are transferred to an intermediate transfer body 9 to obtain a full-color visible image. The visible color image is transferred to and fixed on a transfer medium 2. The image forming section that performs the above-described control is constituted by a drum unit 13 having the photosensitive drum 15, a primary charging unit having a contact-type charging roller 17, a cleaning unit, a developing unit, the intermediate transfer body 9, a paper cassette 1, a feed unit including various rollers 3, 4, 5, 7, a transfer unit having a transfer roller 10 and a fixing unit 25.

The drum unit 13 is constructed by integrating the photosensitive drum (photoreceptor) 15 and a cleaner container 14 having a cleaning mechanism that serves also as the holder of the photosensitive drum 15. The drum unit 13 is supported on the printer proper in a freely attachable and detachable manner and is capable of being replaced with ease when the photosensitive drum 15 reaches the end of its service life. The photosensitive drum 15 includes an aluminum cylinder the peripheral surface of which is coated with an organic photoconductor layer and is rotatably supported on the cleaner container 14. The photosensitive drum 15 is rotated by transmission of the driving force from a drive motor (not shown), the drive motor rotating the photosensitive drum 15 counter-clockwise in conformity with the image forming operation. The electrostatic latent image is formed by selectively exposing the surface of the photosensitive drum 15. The scanner 30 has a motor 31a by which the polygon mirror is rotated in synchronization with the horizontal synchronizing signal of the image signal, whereby the modulated laser beam is reflected to irradiate the photosensitive drum 15 via a lens 32 and reflecting mirror 33.

In order to make the electrostatic latent image a visible image, the developing unit has three color developing devices 20Y, 20M, 20C for developing the colors yellow (Y), magenta (M) and cyan (C), respectively, and a single black developing unit 21B for developing the color black (B). The color developing devices 20Y, 20M, 20C and black developing unit 21B are provided with sleeves 20YS, 20MS, 20CS and 21BS, respectively, and with coating blades 20YB, 20MB, 20CB and 21BB, respectively, which are in pressured contact with the outer peripheries of the respective sleeves 20YS, 20MS, 20CS, 20BS. The three color developing devices 20Y, 20M, 20C are further provided with coating rollers 20YR, 20MR, 20CR.

The black developing unit 21B is mounted on the printer proper in a freely attachable and detachable manner. The color developing devices 20Y, 20M, 20C are mounted, in a freely attachable and detachable manner, on a developing rotary 23 which rotates about a rotary shaft 22.

The sleeve 21BS of the black developing device 21B is spaced away from the photosensitive drum 15 by a minute distance of, say, 300 µm. The black developing device 21B transports toner by an internally provided feed member and an electric charge is applied to the toner by frictional charging in such a manner that the coating blade 21BB will coat the outer periphery of the sleeve 21BS, which rotates in the clockwise direction, with the toner. Further, by applying a developing bias to the sleeve 21BS, the toner on the photosensitive drum 15 is developed in conformity with the electrostatic latent image, whereby a visible image is formed on the photosensitive drum 15 by the black toner.

The three color developing devices 20Y, 20M, 20C rotate along with the developing rotary 23 at the time of image formation so that the prescribed ones of the sleeves 20YS, 20MS, 20CS are made to oppose the surface of the photosensitive drum 15 across minutely small distances of 300 µm. As a result, the prescribed ones of the color developing devices 20Y, 20M, 20C are stopped at a developing position relative to the photosensitive drum 15 so that a visible image is formed on the photosensitive drum 15.

When the color image is formed, a developing process is executed whereby the developing rotary 23 is rotated per each revolution of the intermediate transfer body 9 so that development is performed by the yellow developing device 20Y, magenta developing device 20M, cyan developing device 20C and black developing device 20Y, in the order mentioned. The intermediate transfer body 9 makes four revolutions to successively form visible images using the yellow, magenta, cyan and black toners. As a result, a full-color visible image is formed on the intermediate transfer body 9.

The intermediate transfer body 9 is adapted to contact the photosensitive drum 15 and rotates attendant upon rotation of the photosensitive drum 15. The intermediate transfer body 9 rotates clockwise at the time of formation of the color image and receives transfer of the four visible images from the photosensitive drum 15. At the time of image formation, the transfer roller 10, described later, contacts the intermediate transfer body 9 and transports the transfer medium 2 embraced by the intermediate transfer body 9 and the transfer roller 10, whereby the visible color images on the intermediate transfer body 9 are transferred to the transfer medium 2 simultaneously. Disposed about the periphery of the intermediate transfer body 9 are a TOP sensor 9a and an RS sensor 9b, which sense the position of the intermediate transfer body 9, and a density sensor 9c for sensing the density of the toner image that has been transferred to the intermediate transfer body 9.

The transfer roller 10 has a transfer charging device supported so as to be capable of contacting and separating from the photosensitive drum 15. The transfer roller 10 is constructed by winding a foamed elastic body of intermediate resistance on a metal shaft.

As indicated by the solid line in FIG. 23, the transfer roller 10 is spaced away from the intermediate transfer body 9 so that the visible color images will not be disturbed during the multiple transfer of the visible color images to the intermediate transfer body 9. After the four visible color images have been formed on the intermediate transfer body 9, the transfer roller 10 is moved upward to the position indicated by the phantom line by a cam member (not shown) in conformity with the timing at which the visible color images are transferred to the transfer medium 2. As a result, the transfer roller 10 is brought into pressured contact, at a prescribed force, with the intermediate transfer body 9 via the intermediary of the transfer medium 2. In addition, a bias voltage is applied so that the visible color images on the intermediate transfer body 9 are transferred to the transfer medium 2.

The fixing unit 25, which fixes the transferred visible color images while transporting the transfer medium 2, has a fixing roller 26 for heating the transfer medium 2, and a pressurizing roller 27 for bringing the transfer medium 2 into pressured contact with the fixing roller 26. The fixing roller 26 and the pressurizing roller 27 are formed to be hollow and internally incorporate heaters 28, 29, respectively. That is, the transfer medium 2 bearing the visible color images is transported, heated and pressurized by the fixing roller 26 and pressurizing roller 27, whereby the toners are fixed on the surface of the transfer medium 2.

The fixed transfer medium 2 is subsequently ejected to a discharge unit by discharge rollers 34, 35, 36, whereby the image forming operation is completed.

Cleaning means cleans residual toner from the photosensitive drum 15 and intermediate transfer body 9. Toner waste left after the visible toner images formed on the photosensitive drum 15 are transferred to the intermediate transfer body 9 or toner waste left after the four visible color images formed on the intermediate transfer body 9 are transferred to the transfer medium 2 is collected in the cleaner container 15.

The transfer medium (printing paper) 2 to be printed on is extracted from the paper cassette 1 by a feed roller 3 and is transported so as to be embraced by the intermediate transfer body 9 and transfer roller 10, whereby a color toner image is recorded on the paper. The toner image is then fixed by passing the paper through the fixing unit 25. In case of single-sided printing, a guide 38 defines a transport path that leads the printing paper to the overlying paper discharge section. If the printing paper is to undergo double-sided printing, the guide 38 forms a path that leads the printing paper to the underlying double-sided printing unit.

Printing paper that has been introduced to the double-sided printing unit first is fed into an area below the cassette 1 (see the transport path indicated by the two-dot broken line) by a transport roller 40, after which the printing paper is transported in the reverse direction and sent to a duplex tray 39. The printing paper received in the duplex tray 39 will be upside down relative to the printing paper stacked in the paper cassette 1 and its orientation in terms of the transport direction will have been reversed. By performing transfer and fixing of a toner image again under these conditions, double-sided printing can be performed.

<Processing Procedure when Poster Printing is Performed>

Figure 10:
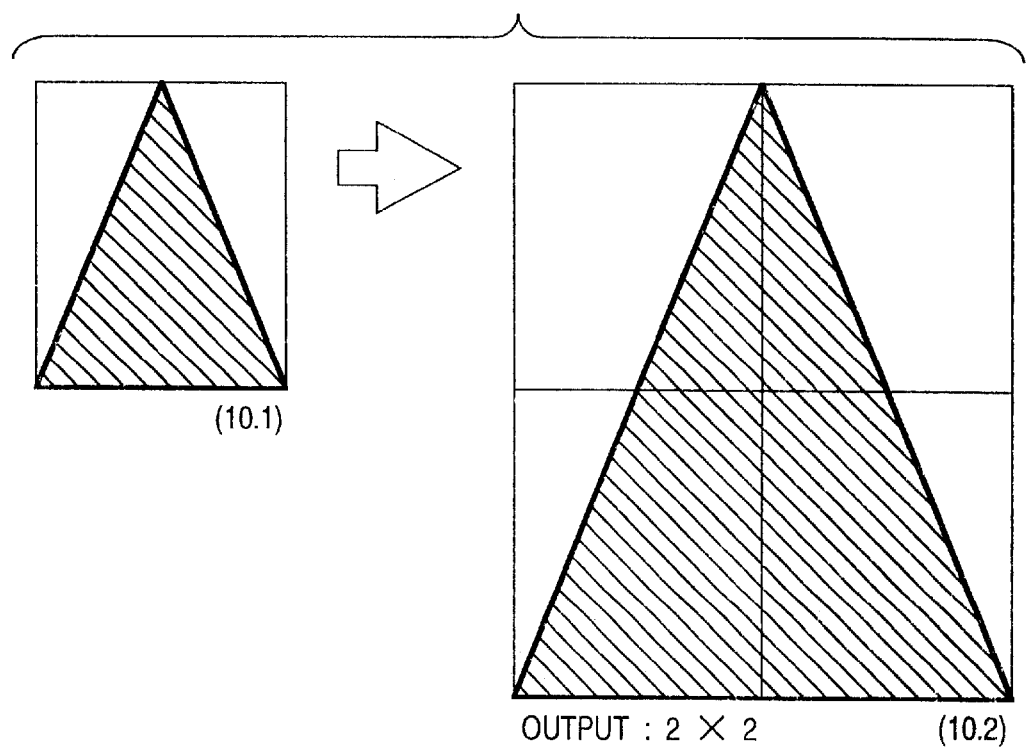
FIG. 10 is a diagram exemplifying result of printing using poster printing (2×2)

FIG. 10 exemplifies the result of poster printing. Poster printing is achieved using the printing system described above. This function uses the system of FIGS. 1 to 4 to draw, in enlarged form, the content of one page drawn by an application, and prints the enlarged image upon dividing it among a plurality of physical pages, i.e., a plurality of sheets (of paper, for example). By connecting the sheets of paper bearing the divided enlarged image, it is possible to obtain an output result that is larger than the size of the paper supported by the printing system. FIG. 10 illustrates the result of printing in a case where the system has been set so as to divide an output image in 2×2 sheets of paper. It is also possible to set the system for 3×3, 4×4 etc., sheets of paper.

Figure 4:
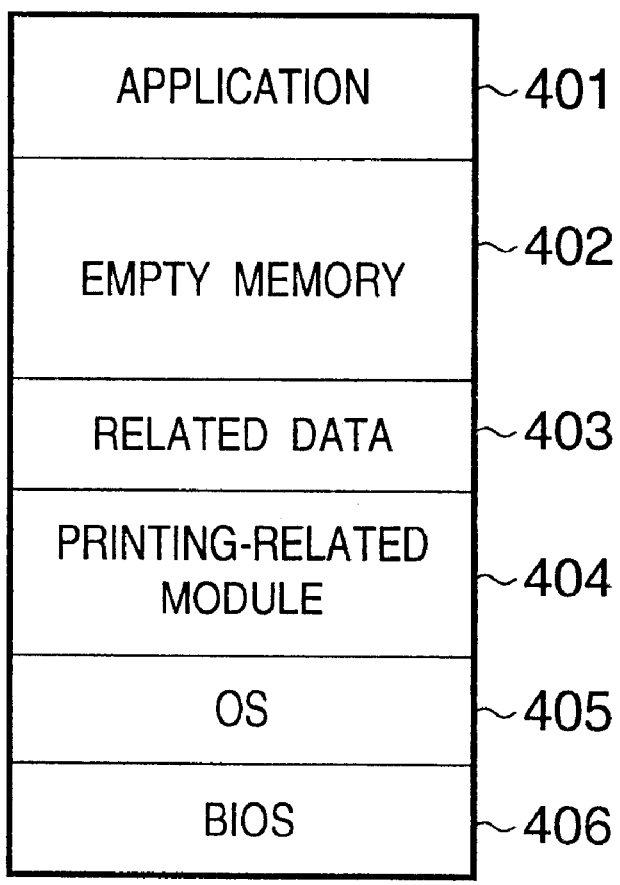
FIG. 4 is a diagram of a memory map of a state in which a printing-related module has been loaded in a RAM of a host computer so as to be capable of execution.

FIG. 4 illustrates a memory map of a state in which a printing-related module, which includes a printing mode control program according to this embodiment, has been loaded in the RAM 2 of the host computer 3000 so as to be capable of execution.

Figure 24:
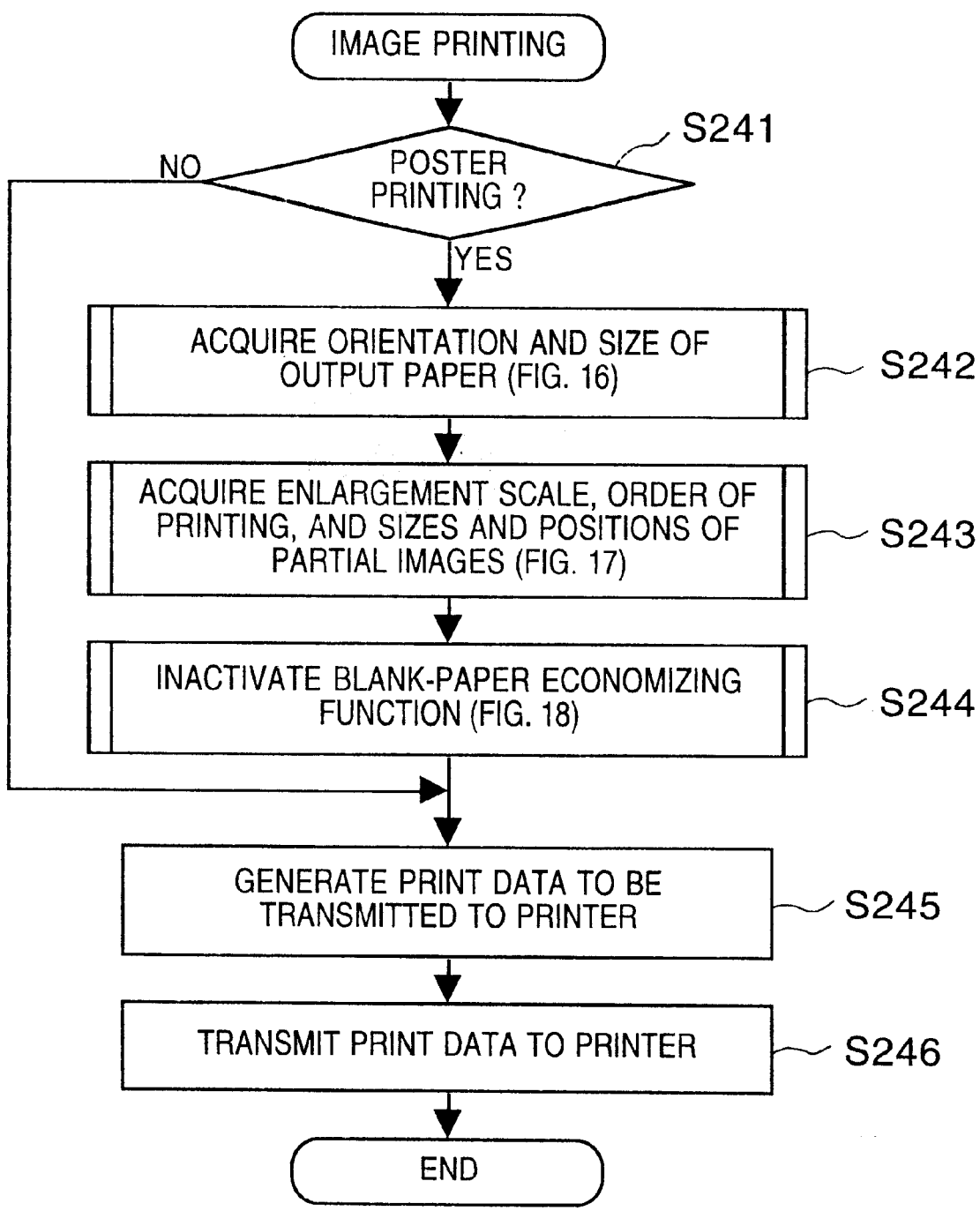
FIG. 24 is a flowchart of a printing processing according to the present invention.

FIG. 24 illustrates a general flow a printing processing procedure. This procedure is executed by the host computer 3000 except the application 201 in FIG. 3.

Figure 16:
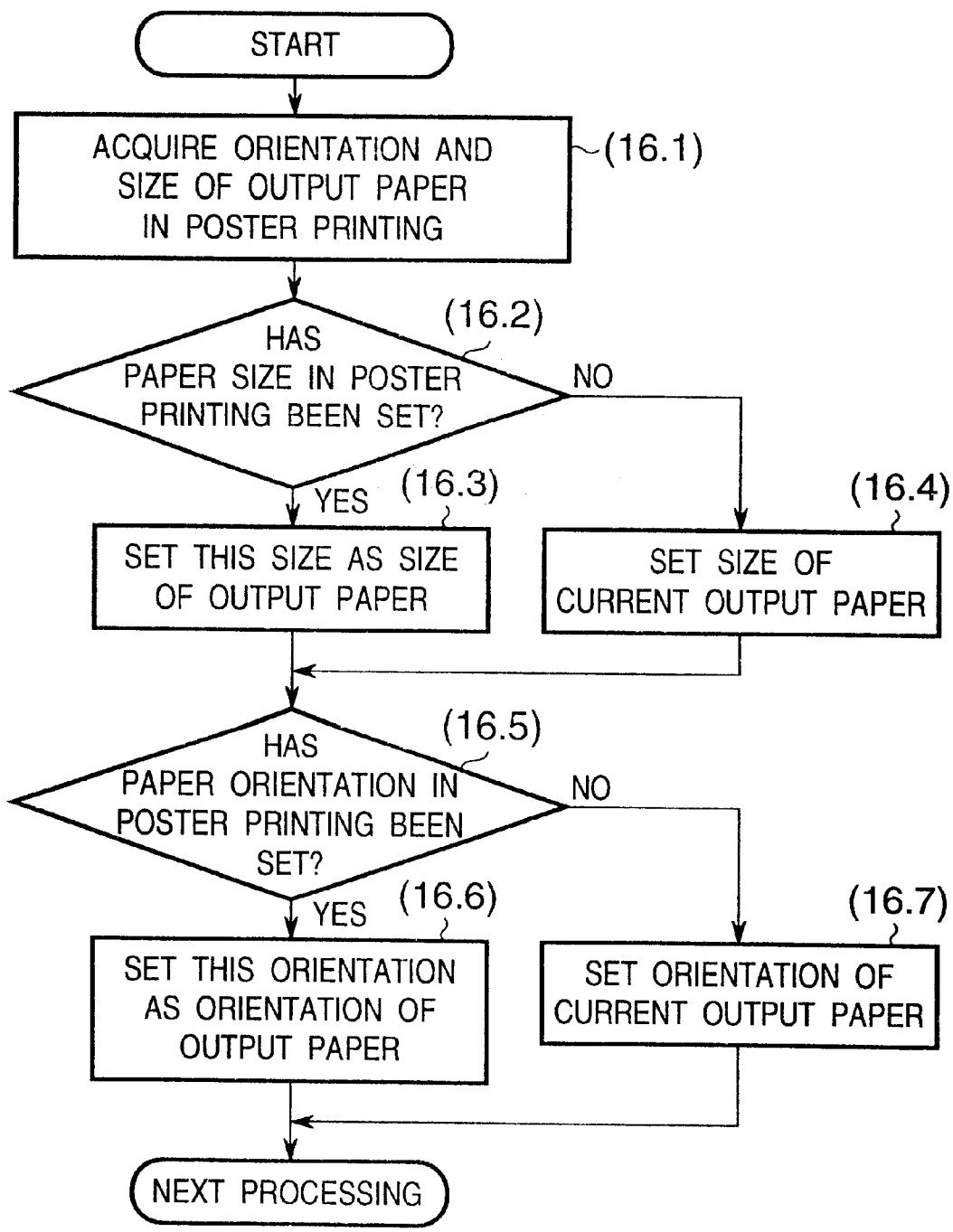
FIG. 16 is a flowchart of a processing procedure for acquiring various settings in poster printing.
Figure 17:
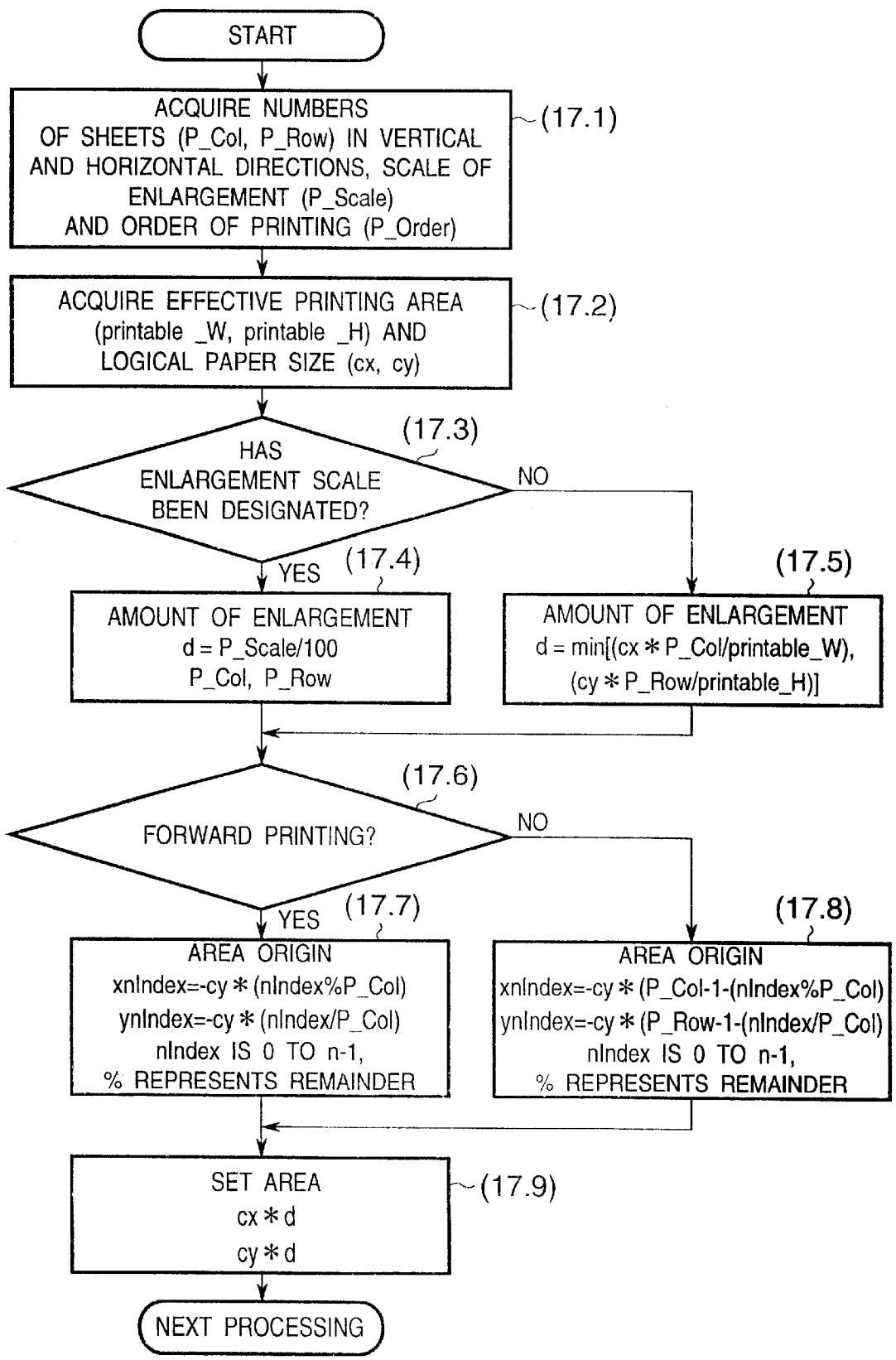
FIG. 17 is a flowchart of a processing procedure for computing an approach to image division and enlargement scale in poster printing.

When a user instructs the host computer 3000 to print an image generated by the application 201, the procedure in FIG. 24 is executed. First, determination of whether or not the poster printing function is available is made in step 241. If the poster printing function is available, the orientation and size of the output paper is acquired in step 242. Detailed description for this step is shown in FIG. 16. Next, the enlargement scale, order of printing and sizes and positions of the partial images are acquired in step 243. Detailed description for this step is shown in FIG. 17. Next, the blank-paper economizing function is inactivated in step 244. Whenever the poster printing function is selected, the blank-paper economizing function is not used. This step is described in detail in FIG. 18. By the steps 242–244, required parameters to perform the poster printing function are prepared.

In step 245, print data to be transmitted to the printer is generated by using the image data generated by the application 201 and the parameters acquired in step 242–244. If the poster printing function is available, the partial images obtained by dividing the enlarged original image are generated. In step 246, the print data generated in step 245 is transmitted to the printer.

FIGS. 16 and 17 are flowcharts illustrating processing procedures of an enlarged printing function (poster printing function). The despooler 305 is equipped for this processing and the processing is executed in accordance with the flow of FIGS. 16, 17 when the despooler 305 sends intermediate codes to the graphic engine 202. The processing associated with the poster printing function will be described in simple terms using FIGS. 16 and 17.

First, as shown in FIG. 16, settings relating to the paper on which the output will be produced are made. Acquisition processing is executed at step 16.1 to acquire the orientation and size of the output paper used in poster printing. If particular values have not been designated, the settings are not acquired at this step. Next, it is determined at step 16.2 whether the size of output paper that will be used in poster printing has been set. If the size has been set ("YES" at step 16.2), then this size is adopted as the size of the output paper in poster printing at step 16.3. If the size has not been set ("NO" at step 16.2), then the size of the paper set for the current output is adopted as the size of the output paper in poster printing at step 16.4.

Next, it is determined at step 16.5 whether the orientation of output paper that will be used in poster printing has been set. If the orientation has been set ("YES" at step 16.5), then this orientation is adopted as the orientation of the output paper in poster printing at step 16.6. If the orientation has not been set ("NO" at step 16.5), then the orientation of the paper set for the current output is adopted as the orientation of the output paper in poster printing at step 16.7.

The size and orientation of the output paper are thus set through the above-described procedure.

The enlargement of an image and the manner in which it is divided are set in FIG. 17. First, if the numbers of sheets of paper in the vertical and horizontal directions have been designated, these values are acquired together with the order of printing, and if the scale of enlargement of the image has been designated, this value is acquired together with the order of printing at step 17.1. Let P_Col and P_Row represent the numbers of sheets of paper in the horizontal and vertical directions, respectively, let P_Scale represent the scale of enlargement, and let P_Order represent the order of printing. Next, the size of the effective area of the original image and the logical paper size are acquired at step 17.2. Both are expressed by width and height, which are represented by (printable_W, printable_H) in the case of the size of the effective area and by (cx, cy) in the case of the logical paper size. The logical paper size mentioned here is the size of each partial image obtained as a result of dividing up the enlarged image in accordance with the size and orientation that have been set by the processing of FIG. 16.

On the basis of these values, it is determined at step 17.3 whether an enlargement scale has been designated. If an enlargement scale has been designated ("YES" at step 17.3), enlargement is performed using this scale of enlargement irrespective of the number of sheets of paper designated earlier. Since the entered enlargement scale P_Scale is designated as a percentage, enlargement ratio d is found as $$d = P\_Scale/100$$

as step 17.4 At this time the numbers P_Row, P_Col of sheets of paper in the vertical and horizontal directions, respectively, used in poster printing are calculated. A value obtained by rounding up the decimal fraction of the value printable_H*d/cy is used as the number P_Row of sheets in the vertical direction, and a value obtained by rounding up the decimal fraction of the value printable_W*d/cx is used as the number P_Col of sheets in the horizontal direction.

Further, in a case where an enlargement scale has not been designated, the enlargement ratio d is calculated in accordance with the equation $$d=\min[(cx*P\_Col)/printable\_W, (cy*P\_Row)/printable\_H]$$

at step 17.5. The above equation means that the ratio of the dimensions of the original image to the dimensions of the image after enlargement is obtained in regard to each of the vertical and horizontal directions and the smaller of the ratios is adopted as the enlargement scale.

Executed next is processing for calculating reference points used when dividing an enlarged image. Positions in an image, prior to the division thereof, that correspond to the origin of logical coordinates in each partial area after division are calculated as the reference points. Since it is required that the calculated reference points of the partial areas be ordered in conformity with the order of printing, decision processing is executed at step 17.6 to determine, from the printing order P_Order acquired earlier, whether printing is forward printing. A reference point ($x_{nIndex}$, $Y_{nIndex}$) of nIndex (nIndex is the index of each partial image area, where nIndex=0 to n−1) of each partial image area obtained by division into n areas (n=P_Col×P_Row) is obtained as follows in dependence upon the decision rendered at step 17.6:

If printing is forward printing ("YES" at step 17.6), then we have $$x_{nIndex}=-cx*(nIndex\%P\_Col)$$

$$y_{nIndex}=-cy*(nIndex/P\_Col)$$

at step 17.7, where the operation "%" indicates calculation to obtain the remainder and the operation "/" indicates calculation to obtain the quotient.

If printing is determined to be reverse printing ("NO" at step 17.6), then the reference point of nIndex (nIndex=0 to 1) of each partial image area is given by $$x_{nIndex}=-cx*(P\_Col-1-(nIndex\%P\_Col))$$

$$y_{nIndex}=-cy*(P\_Row-1-(nIndex/P\_Col))$$

at step 17.8.

As a result of the foregoing, the reference point of each partial image area that is output is calculated. The index nIndex of each partial image area indicates the order of output. The partial image areas are output starting from the area whose index value is 0, i.e., in an order obtained by incrementing the index value starting from 0.

FIGS. 14 and 15 are examples illustrating orders of partial image areas that are output, in which forward has been designated in the case of FIG. 14 and reverse in the case of FIG. 15. In the examples of FIGS. 14 and 15, the enlarged image is divided up into 3×3 areas. In FIG. 14 for the forward order, partial images are output in numerical order from upper left to lower right. In the case of reverse order, partial images are output in numerical order from lower right to upper left.

In FIGS. 14 and 15, the partial image areas are numbered from 1 to indicate their order. However, since nIndex starts from 0, this takes on a value obtained by subtracting 1 from the number.

Next, setting processing, which is for obtaining the size of the enlarged image, is performed at step 17.9. This is found from the size of the original image and the scale of enlargement, which have already been acquired or calculated, as follows:

$$printable\_W*d, printable\_H*d$$

The thus obtained reference-point coordinates of an image printing per each sheet of paper and the image size after enlargement are sent from the despooler 305 to the graphic engine 202, enlarged, divided images are formed by the graphic engine and these are sent to the printer, which proceeds to print them, i.e., to execute poster printing.

FIG. 10 shows an example of the result of printing in a case where 2×2 namely P_Col=2, P_Row=2, has been designated as the numbers of sheets of paper in the vertical and horizontal directions without designating the size and orientation of the output paper and the scale of enlargement. In this example, the enlargement ratio d is given by d=min (2cx/printable_W, 2cy/printable_H), where cx=printable_W and cy=printable_H. Accordingly, we have enlargement ratio d=min(2,2). In other words, the original image is enlarged twofold in each of the vertical and horizontal direction and is divided into four (2×2) parts (step 17.2).

Figure 12:
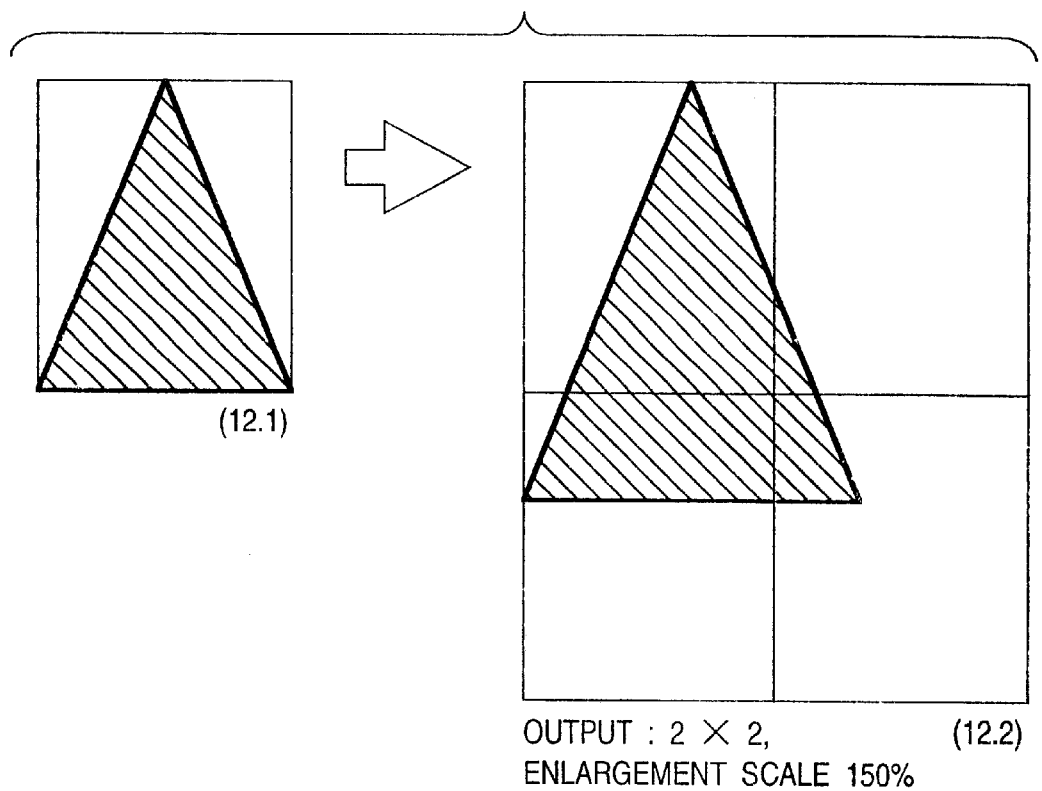
FIG. 12 is a diagram exemplifying result of poster printing at a designated enlargement rate of 150%.

FIG. 12 shows an example of the result of printing in a case where 150% has been designated as the enlargement scale without designating the size and orientation of the output paper. If cx=printable_W and cy=printable_H hold, then we have $$d=150/100=1.5$$

$$P\_Row=roundup\ (printable\_H*d/cy)=roundup\ (cy*1.5/cy)=2$$

$$P\_Col=roundup\ (printable\_W*d/cx)=roundup\ (cx*1.5/cx)=2$$

giving the result shown in FIG. 12.

Figure 13:
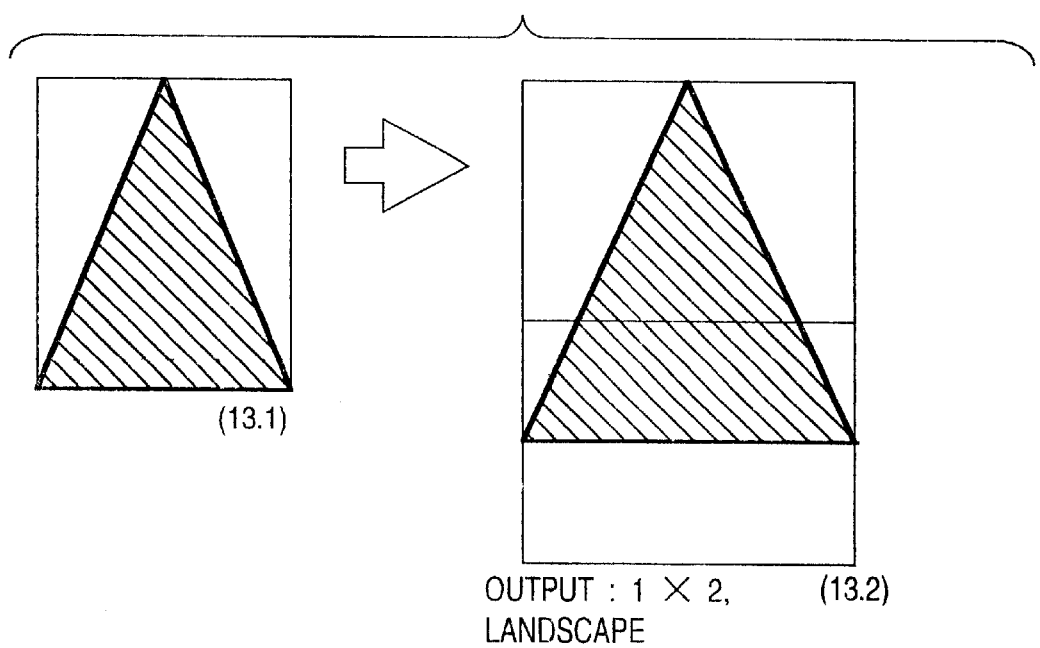
FIG. 13 is a diagram exemplifying result of poster printing (1×2) on oblong paper.

FIG. 13 shows an example of the result of printing in a case where landscape has been made the orientation of the output paper and one sheet of paper in the vertical direction and two sheets of paper in the horizontal direction have been designated as the numbers of sheets in the vertical and horizontal directions, respectively, without designating the size of the output paper and the scale of enlargement.

In this case, P_Col=1 and P_Row=2 hold. If cx=printable_H and cy=printable_W hold, then we have $$d=\min[(cx*P\_Col)/printable\_W, (cy*P\_Row)/printable\_H]=\min[cx*1/cy, (cy*2)/cx]$$

If (cx*1)/cy<(cy*2)/cx holds, the enlarged image has blank areas remaining in the vertical direction. FIG. 13 illustrates an example of such case.

If the enlargement and image dividing scheme have been decided through the procedures of FIGS. 16 and 17, the printer driver 205 generates a command for creating an image in accordance with this decision, the command is sent to the printer and the printer performs poster printing.

<Dealing with Blank-paper Economizing Function>

Figure 18:
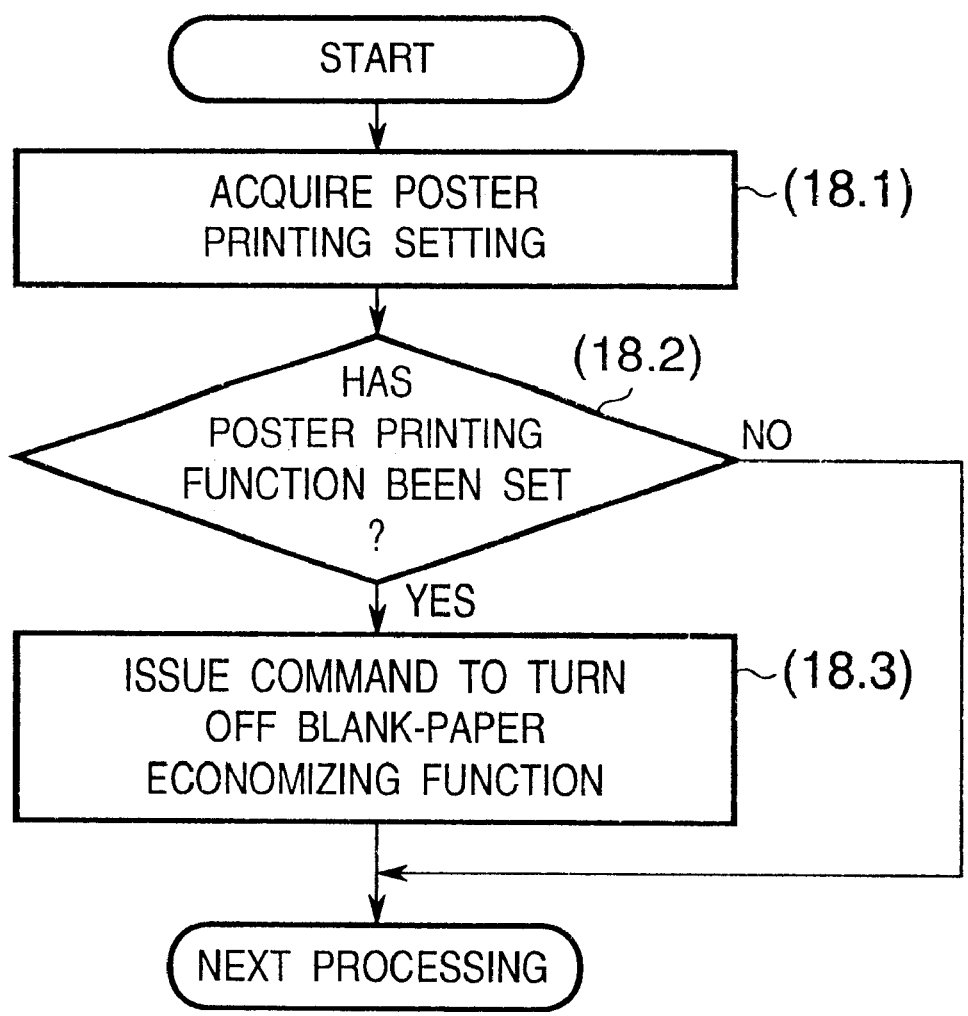
FIG. 18 is a flowchart of processing executed prior to poster printing.

FIG. 18 illustrates the general flow of processing of a printing processing procedure. This procedure is executed in the printer driver based upon information sent via the graphic engine 202 and dispatcher 301.

Figure 5:
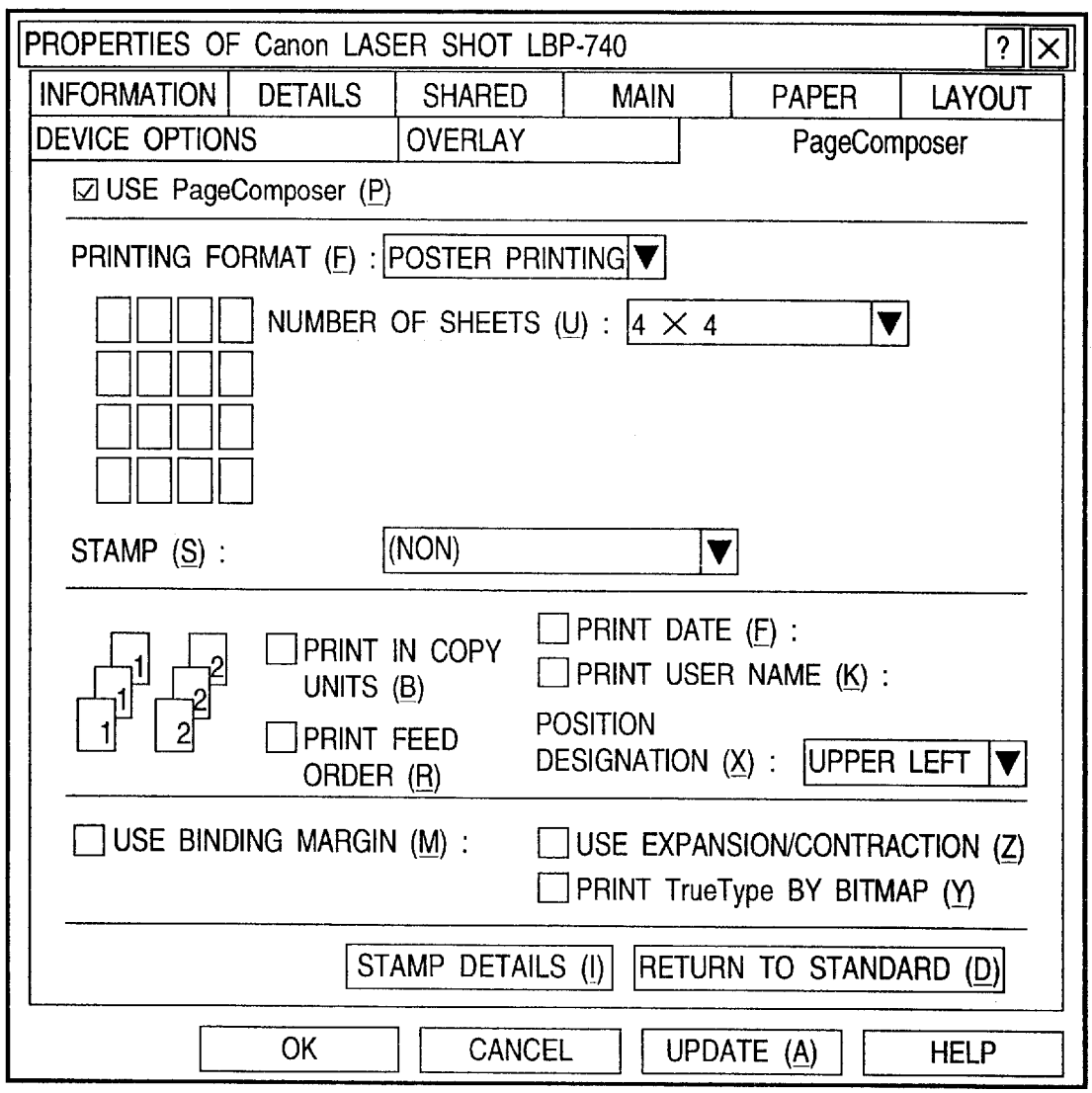
FIG. 5 is a diagram showing a screen for designating poster printing.

First, processing for acquiring the settings of the poster printing function is executed at step 18.1. This is processing for acquiring information that includes whether poster printing set from an interface shown in FIG. 5 has been turned on or off.

Next, it is determined at step 18.2 whether the poster printing function has been set. This is processing which, based upon the information acquired from the processing of the previous step 18.1, determines whether the poster printing function has been set. Here determinations are made that poster printing on 4×4 sheets has been set in the manner shown in FIG. 5 and that the poster printing function is ON.

In a case where these determinations have been made, the printer driver 203 issues a command at step 18.3 to turn the blank-paper economizing function off. The blank-paper economizing function, which is a function possessed by the printer 1500, inhibits the output of a blank sheet of paper when there is no data be printed on a page. This function usually is ON in an ordinary printing operation. The command issuance step 18.3 is processing for turning off this function. As a result, the printer driver 203 sends the printer 1500 a command, e.g., "@PJL SET LPARM:LIPS PAPER-SAVE=OFF", for turning off the blank-paper economizing function.

If poster printing has not been designated, the command for turning off the blank-paper economizing function is not issued.

<Printing Processing by Printer>

Figure 21:
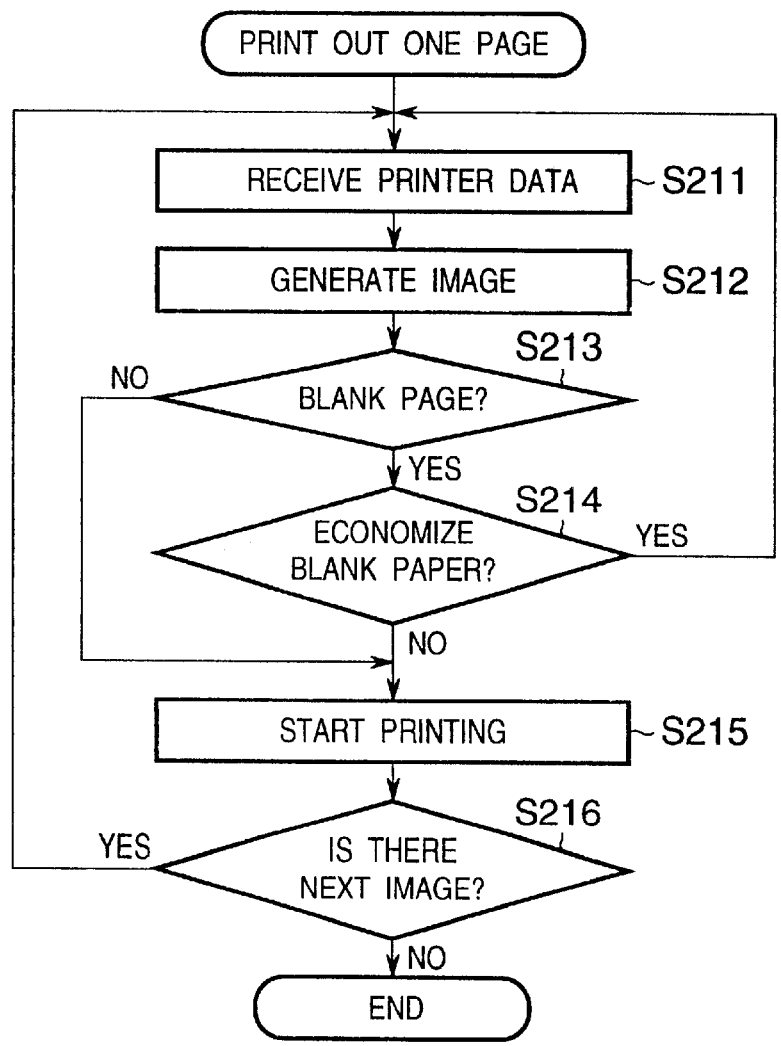
FIG. 21 is a flowchart illustrating a printing processing procedure executed by a printer.

FIG. 21 illustrates a processing procedure executed by the printer 1500 in response to receipt of a print command via the printer driver. First, when print data (a command) is received at step 211, the printer generates image data at step 212 based upon this data. If the received print data is image data per se, then there is no need to draw the image again.

Next, it is determined at step 213 whether a generated image is an all-white image (a blank page). If such is the case ("YES" at step 213), it is determined at step 214 whether the blank-paper economizing function has been set. In the case of poster printing, this function will be off, as described earlier. If the blank-paper economizing function has been set ("YES" at step 214), this page is not printed and the printer generates the image of the next page. If the blank-paper economizing function has been turned off ("NO" at step 214), on the other hand, printing is performed as usual even if the page is a blank page.

Thus, when poster printing is performed, any blank page included is printed.

Figure 11:
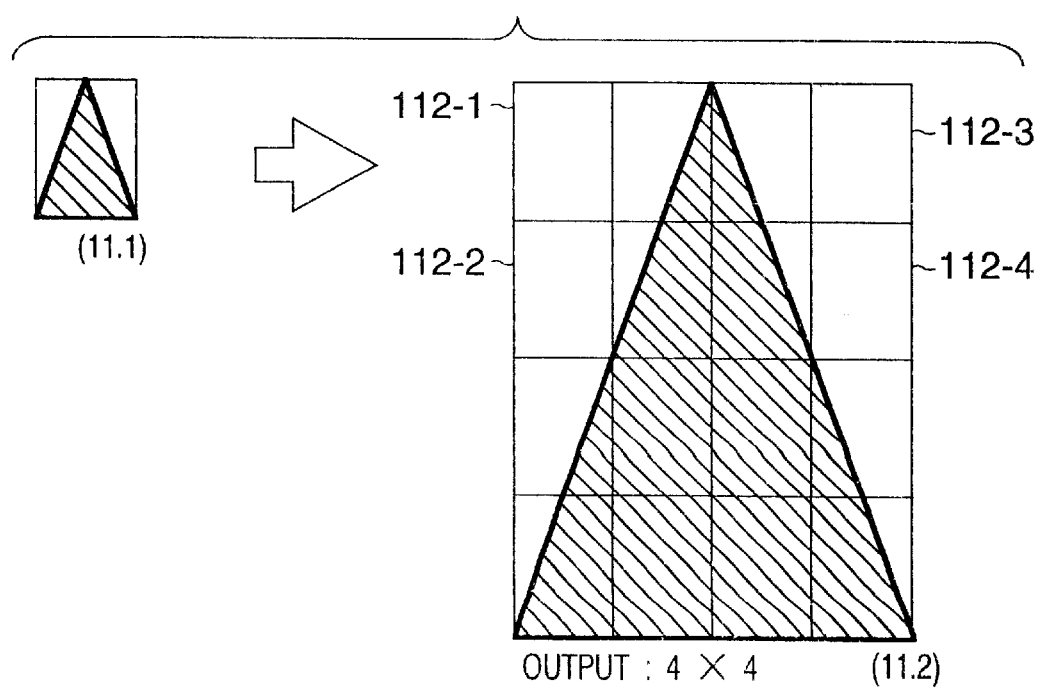
FIG. 11 is a diagram exemplifying result of printing using poster printing (4×4)

FIG. 11 shows output result (11.2) in a case where the original image (11.1) has been printed upon designating poster printing on 4×4 sheets of paper. Paper sheets 112-1 to 112-4 are blank pages generated by enlargement and division. More specifically, these are portions that will not be output unless the blank-paper economizing function is turned off. For example, in a case where output is in the forward direction, the sheets of paper on which images obtained by division are printed are output in raster-scan order per partial image area from the upper left to the lower right of the image (11.2) of FIG. 11. If the blank-page portions are not output, normal results cannot be obtained even if the output product is arranged in a 4×4 layout in the order of output starting from the upper left. In order to reproduce the originally intended image in such case, the operator must know which portions have not been output. However, since conservation of blank paper is carried out by the printer, the operator usually cannot tell which portions have not been output.

In contrast, by turning off the blank-paper economizing function at the time of poster printing, as is done in the printing control system of the present embodiment, the originally intended printed result can be obtained merely by laying out the output product in the order of output.

<Displaying Progress>

Figure 7:
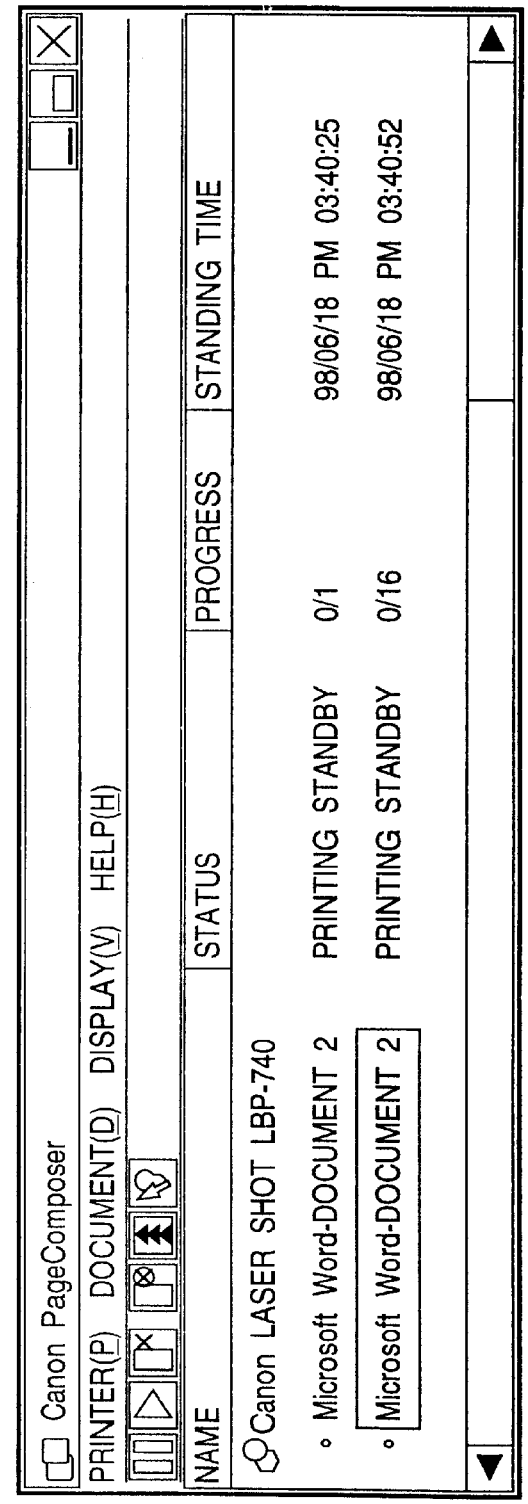
FIG. 7 is a diagram showing an example of a screen which displays the progress of a printing job.

As mentioned above, the spool file manager 304 displays the progress of printing during printing. In the case of poster printing, the display is in units of physical pages (paper sheets) actually output. FIG. 7 shows a display screen in a situation where print jobs remain in the spool file manager 304. FIG. 7 illustrates the state of a case where one page of print data from an application is printed in ordinary fashion (the upper job indication) and the state of a case where one page of the same print data from the application is printed upon being divided into 4×4 sheets using the poster printing function (the lower job indication). In the case of ordinary printing, the status of progress is 0/1, i.e., 0 pages of a total page number of 1 have been output. In the case of poster printing, on the other hand, progress is 0/16, i.e., 0 pages of a total page number of 16 have been output.

FIG. 8 illustrates document information at the time of ordinary printing, and FIG. 9 shows document information at the time of poster printing. In the case of poster printing (FIG. 9), a display 901 of numbers of sheets vertically and horizontally is presented graphically.

Figure 20:
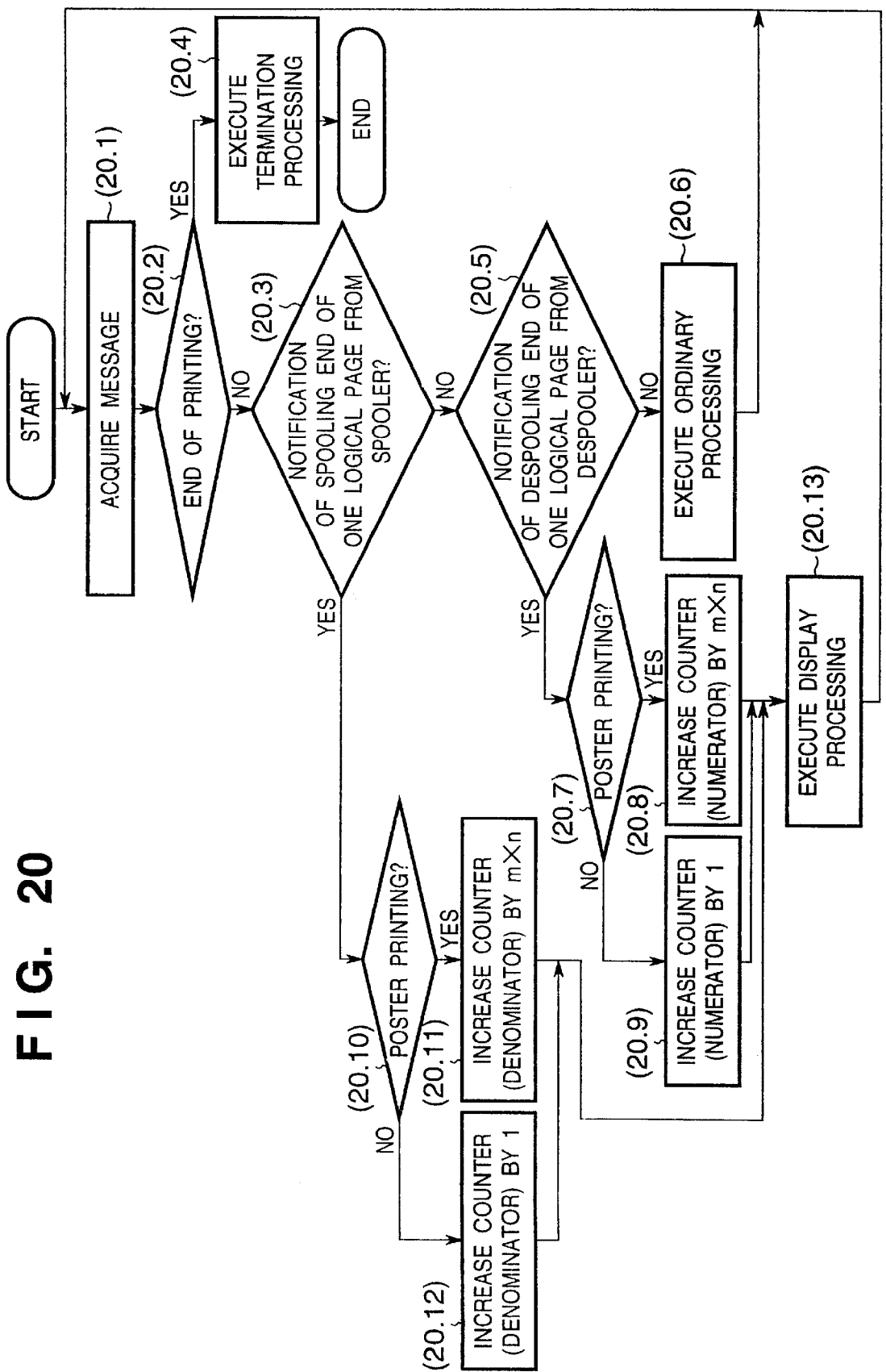
FIG. 20 is a flowchart illustrating a processing procedure performed by a spool file manager to display printing progress.

FIG. 20 is a flowchart of processing executed by the spool file manager 304 to display the progress of print processing. First, a message is acquired form spooler 302 or despooler 305 at step 20.1 and it is determined at step 20.2 whether this message indicates end of printing regarding a certain job. If the message indicates end of printing, then this job is finished and, hence, the required termination processing, such as deleting the job information, is executed at step 20.4.

If printing is not finished, it is determined at step 20.3 whether there is notification of spooling end of one logical page (i.e., image data printed on one sheet of paper) from the spooler 302. If the decision rendered is "YES", it is determined at step 20.10 whether poster printing has been designated for the job to which the received message corresponds (this job will be referred to as the "corresponding job" below). If poster printing has been designated, m×n is added to a denominator counter representing the number of pages spooled (step 20.11). Here m×n is the number of pages printed upon division of an image when poster printing is performed. The denominator counter is initialized to zero before the initial page of a print job is spooled. If the printing operation is not poster printing, then 1 is added to the denominator counter. Since a message is not received from the despooler during spooling, the content of the denominator counter increases until the value of the total number of pages is attained. The content of the denominator counter is displayed as the total number of pages in FIG. 7 at step 20.13. Here the total number of pages output, namely the denominator, is displayed as 0.

In a case where the acquired message is not notification of spooling end of one logical page from the spooler 302, it is determined at step 20.5 whether the message is notification of despooling end of one logical page from the despooler. If the decision rendered at step 20.5 is "NO", the processing conforming to this message is executed at step 20.6. If the message is notification of despooling end, then it is determined at step 20.7 whether the corresponding job is poster printing. If the decision is "YES", then m×n is added to a numerator counter at step 20.8. If the decision is "NO", then 1 is added to the numerator counter at step 20.9. The thus calculated contents of the denominator and numerator counters are displayed in the manner illustrated in FIG. 7 at step 20.13.

By adopting this arrangement, the number of pages that should be printed and the progress of printing can be displayed also at the time of poster printing. This makes it possible for the operator to ascertain the accurate values.

<Processing when Printing Cannot be Performed Normally>

Figure 6:
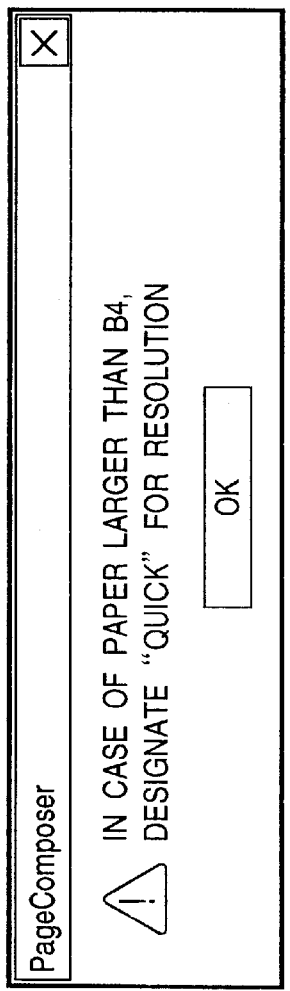
FIG. 6 is a diagram showing a warning message display in a case where it has been determined that a limited printing mode is in effect.
Figure 19:
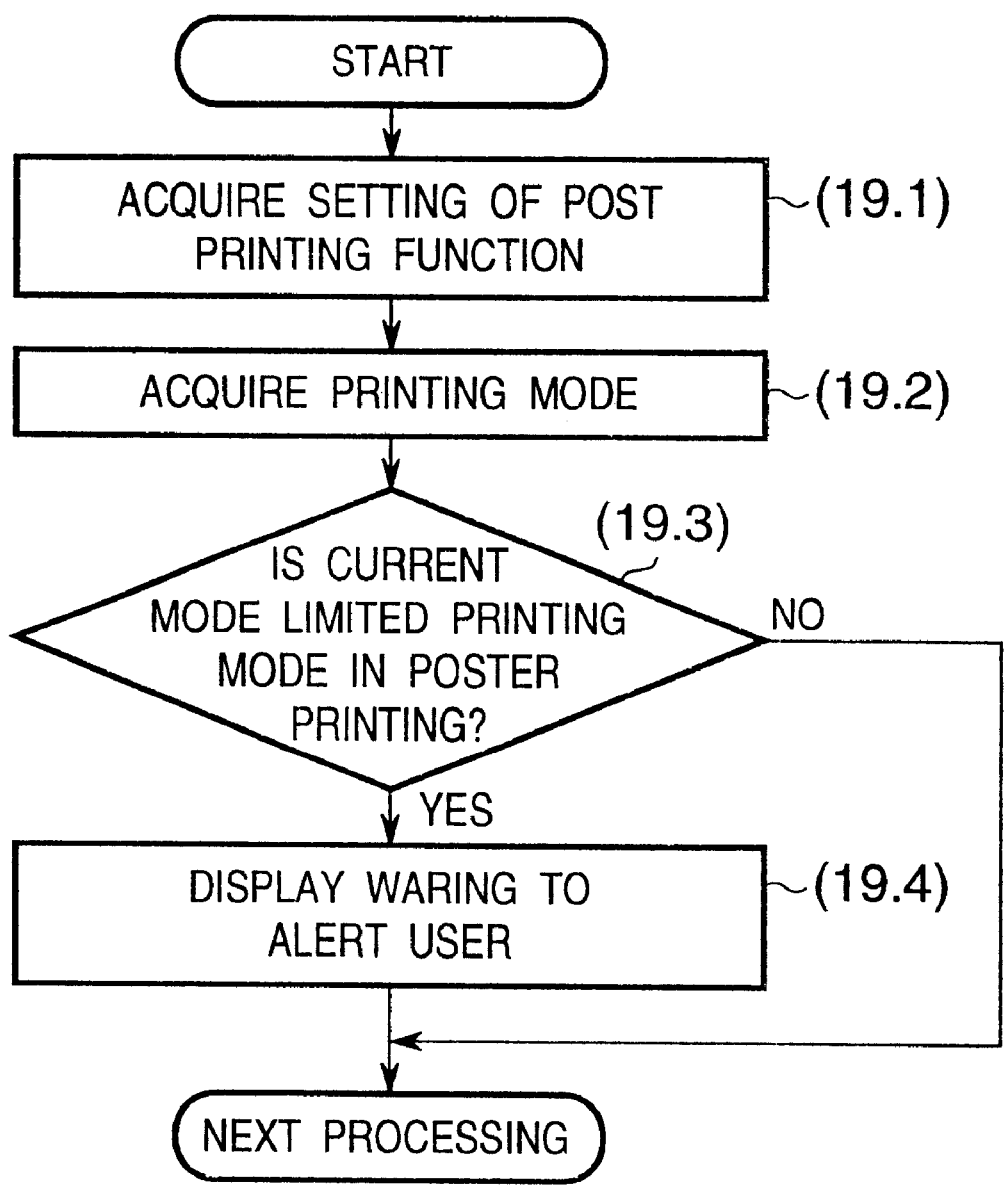
FIG. 19 is a flowchart of processing executed prior to poster printing.

There are cases where a warning display is presented owing to limitations upon the graphic engine 202 at the time of poster printing. FIG. 19 is a flowchart showing the general features of such processing when a printing setting is made in the printer driver 203 at the time of printing from an application. FIG. 6 illustrates an example of the above-mentioned warning display.

In FIG. 19, various settings associated with the poster printing function are acquired at step 19.1 to thereby acquire information relating to the poster printing function. Here it will be assumed that poster printing has been set to the 4×4 output.

Next, the printing-mode setting is acquired at step 19.2. This is processing for acquiring the printing mode currently set. This printing mode includes resolution information. It will be assumed here that a fine mode (600 dpi) has been set as the resolution.

Next, it is determined at step 19.3 whether the current mode is a limited printing mode for use in poster processing. Specifically, owing to limitations upon the graphic engine 202, there are printing modes in which printing cannot be performed normally because of the relationship between resolution and the size of the poster which the operator is attempting to produce. Such a printing mode is a limited printing mode. For example, if the graphic engine is a 16-bit graphic engine and a 600-dpi A4 landscape-size image is to be enlarged ten times, the number of pixels in the horizontal direction will be 10×600 (dot/inch)×296 (mm)/25.4 (mm/inch)=69,921 dots. This means that the size of the image in the horizontal direction can no longer be expressed by 16 bits. In this case, the setting to multiply the 600-dpi A4 landscape-size image tenfold is a limited printing mode.

Figure 22:
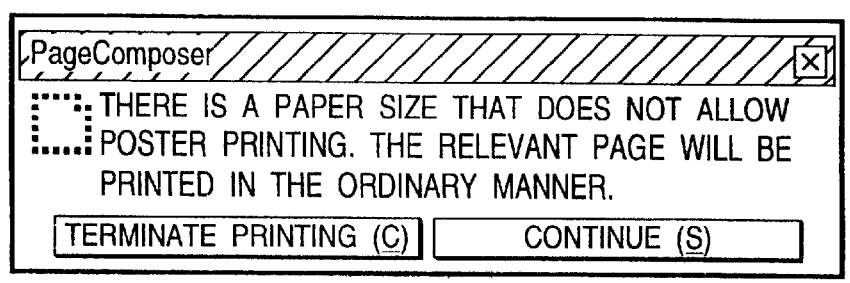
FIG. 22 is a diagram showing an example of a display of a warning message in a case where poster printing cannot be performed.

If it is determined that the limited printing mode is in effect, printing cannot be performed correctly and, hence, display processing to alert the user is executed at step 19.4. A warning of the kind shown in FIG. 6 is displayed by this display processing. However, as this is merely a display to alert the user, it is possible to continue with printing as is. Further, there are cases where an error results owing to limitations upon the graphic engine 202 in similar fashion at the time of printing by the despooler. At such time a warning of the kind shown in FIG. 22 is displayed. The user can select "CONTINUE" to perform printing as usual or "TERMINATE PRINTING" to stop printing.

OTHER EMBODIMENTS

The present invention can be applied to a system constituted by a plurality of devices (e.g., a host computer, interface, reader, printer, etc.) or to an apparatus comprising a single device (e.g., a copier or facsimile machine, etc.). Furthermore, the object of the invention is attained by supplying a system or an apparatus with a storage medium storing the program code of the processing of FIGS. 16 to 21 for implementing the functions of the foregoing embodiment, reading the program code with a computer (e.g., a CPU or MPU). of the system or apparatus from the storage medium, and then executing the program code.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program code.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program code read from the storage medium is written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Thus, in accordance with the present invention, as described above, a user can specify the manner in which an image is divided and the order in which the divided images are printed in a situation where a poster printing function is used, and normal printed results can be obtained merely by joining output sheets of paper together in an order that conforms to the manner of division even if the apparatus is equipped with a blank-paper economizing function.

In addition, when poster printing is performed, the user can specify the sizes of the areas bearing the divided images as well as the manner in which these areas are arranged.

Further, it is possible to display the progress of a poster printing operation.

When use is made of the poster printing function and a situation arises in which printing cannot be performed normally owing to limitations on the graphic engine, the user is notified of this in advance or the user can check this at the time of printing.

As many apparently widely different embodiments of the present invention can be made without departing from the spirit and scope thereof, it is to be understood that the invention is not limited to the specific embodiments thereof except as defined in the appended claims.

What is claimed is:

1. A printing control apparatus, operating as a host computer, for generating print data including printer control commands to be printed by a printer, comprising:

an input unit for inputting an enlargement-division method indicating how to enlarge and divide an image, which is set through an interface screen image provided by a printer driver;

a page division unit for acquiring an enlargement ratio for enlarging an image represented by original data to be printed on a page output by an application in accordance with the inputted enlargement-division method and dividing the original data to be printed on a page into data to be printed in plural pages; and a print data generation unit for generating print data so that the print data is transmitted to the printer and printed by the printer in a predetermined order in accordance with the data processed by said page division unit.

2. The apparatus according to claim 1, wherein the designated size is designated by rate of enlargement of the image represented by the original data output from the application.

3. The apparatus according to claim 1, wherein the designated size is designated by size of each divided image and number of divided images.

4. The apparatus according to claim 1, wherein the predetermined order is an order in which the enlarged image can be reconstructed by arranging divided images that have been divided and printed in said order.

5. The apparatus according to claim 1, further comprising a display control unit for displaying progress of output of the print data for the plural pages resulting from division.

6. The apparatus according to claim 1, further comprising a spool unit for converting the data output from the application into intermediate code and storing the intermediate code in a spool file, wherein said page division unit processes the data stored in the spool file so as to enlarge an image represented by the intermediate code to the designated size and divide the enlarged image into plural pages.

7. The apparatus according to claim 6, wherein said spool unit receives the original data output from the application through a graphic engine and said page division unit outputs the print data divided into the plural pages to the graphic engine.

8. The apparatus according to claim 7, further comprising a warning display control unit for detecting a state in which said print data divided into the plural page cannot be printed normally and displaying warning for giving notification of this fact.

9. The apparatus according to claim 8, wherein the state in which said print data divided into the plural page cannot be printed normally is one in which a size that cannot be handled by the operating system because of a limitation of the graphic engine has been designated as the designated size.

10. The apparatus according to claim 1, wherein the printer has a function which ignores printing of a blank page, and when said print data generation unit generates print data in accordance with the data processed by said page division unit, said print data generation unit issues an instruction not to use the function which ignores printing of a blank page to the printer.

11. The apparatus according to claim 1, wherein it can be instructed through a displayed instruction screen whether a poster print processing, in which the original data for a page output from an application is processed so as to enlarge an image represented by the original data and divide the enlarged image into plural pages, is performed or not.

12. The apparatus according to claim 1, further comprising a determination unit for determining whether an order of output is a normal order or a reverse order, wherein the print data is output to the printer in upper-left to right order when it is determined that the order of output is the normal order, whereas the print data is output to the printer in lower-right to left order when it is determined that the order of output is the reverse order.

13. A printing control method performed in a host computer, for generating print data including printer control commands to be printed by a printer, comprising:

an input step of inputting an enlargement-division method indicating how to enlarge and divide an image, which is set through an interface screen image provided by a printer driver;

a page division step of acquiring an enlargement ratio for enlarging an image represented by an original data to be printed on a page output by an application in accordance with the inputted enlargement-division method and dividing the original data to be printed on a page into data to be printed in plural pages; and a print data generation step of generating print data so that the print data is transmitted to the printer and printed by the printer in a predetermined order in accordance with the data processed in said page division step.

14. The method according to claim 13, wherein the designated size is designated by rate of enlargement of the image represented by the original data output from the application.

15. The method according to claim 13, wherein the designated size is designated by size of each divided image and number of divided images.

16. The method according to claim 13, wherein the predetermined order is an order in which the enlarged image can be reconstructed by arranging divide images that have been divided and printed in said order.

17. The method according to claim 13, further comprising a display step of displaying progress of output of the print data for the plural pages resulting from division.

18. The method according to claim 13, further comprising a spool step of converting the data output from the application into intermediate code and storing the intermediate code in a spool file, wherein the data stored in the spool file is processed in said page division step so as to enlarge an image represented by the intermediate code to the designated size and divide the enlarged image into plural pages.

19. The method according to claim 18, wherein the original data output from the application is received in said spool step through a graphic engine and the print data divided into the plural pages is output to the graphic engine in said page division step.

20. The method according to claim 19, further comprising a warning display control step of detecting a state in which said print data divided into the plural page cannot be printed normally and displaying warning for giving notification of this fact.

21. The method according to claim 20, wherein the state in which said print data divided into the plural page cannot be printed normally is one in which a size that cannot be handled by the operating system because of a limitation of the graphic engine has been designated as the designated size.

22. The method according to claim 20, wherein the printer has a function which ignores printing of a blank page, and when said print data generation unit generates print data in accordance with the data processed in said page division step, an instruction not to use the function which ignores printing of a blank page is issued in said print data generation step to the printer.

23. The method according to claim 13, wherein it can be instructed through a displayed instruction screen whether a poster print processing, in which the original data for a page output from an application is processed so as to enlarge an image represented by the original data and divide the enlarged image into plural pages, is performed or not.

24. The apparatus according to claim 13, further comprising a determination step of determining whether an order of output is a normal order or a reverse order, wherein the print data is output to the printer in upper-left to right order when it is determined that the order of output is the normal order, whereas the print data is output to the printer in lower-right to left order when it is determined that the order of output is the reverse order.

25. A computer program by which a computer is made to implement the following means to generate print data including printer control command to be printed by a printer, comprising:

input means for inputting an enlargement-division method indicating how to enlarge and divide an image, which is set through an interface screen image provided by a printer driver;

page division means for acquiring an enlargement ratio for enlarging an image represented by an original data to be printed on a page output by an application in accordance with the inputted enlargement-division method and dividing the original data to be printed on a page into data to be printed in plural pages; and print data generation means for generating print data so that the print data is transmitted to the printer and printed by the printer in a predetermined order in accordance with the data processed by said page division means.

26. The program according to claim 25, wherein the designated size is designated by rate of enlargement of the image represented by the original data output from the application.

27. The program according to claim 25, wherein the designated size is designated by size of each divided image and number of divided image.

28. The program according to claim 25, wherein the predetermined order is an order in which the enlarged image can be reconstructed by arranging divide images that have been divided and printed in said order.

29. The program according to claim 25, further comprising display control means for displaying progress of output of the print data for the plural pages resulting from division.

30. The program according to claim 25, further comprising spool means for converting the data output from the application into intermediate code and storing the intermediate code in a spool file, wherein said page division means processes the data stored in the spool file so as to enlarge an image represented by the intermediate code to the designated size and divide the enlarged image into plural pages.

31. The program according to claim 30, wherein said spool means receives the original data output from the application through a graphic engine and said page division means outputs the print data divided into the plural pages to the graphic engine.

32. The apparatus according to claim 31, further comprising warning display control means for detecting a state in which said print data divided into the plural page cannot be printed normally and displaying warning for giving notification of this fact.

33. The apparatus according to claim 32, wherein the state in which said print data divided into the plural page cannot be printed normally is one in which a size that cannot be handled by the operating system because of a limitation of the graphic engine has been designated as the designated size.

34. The program according to claim 25, wherein the printer has a function which ignores printing of a blank page, and when said print data generation means generates print data in accordance with the data processed by said page division means, said print data generation means issues an instruction not to use the function which ignores printing of a blank page to the printer.

35. The program according to claim 25, wherein it can be instructed through a displayed instruction screen whether a poster print processing, in which the original data for a page output from an application is processed so as to enlarge an image represented by the original data and divide the enlarged image into plural pages, is performed or not.

36. The program according to claim 25, further comprising determination means for determining whether an order of output is a normal order or a reverse order, wherein the print data is output to the printer in upper-left to right order when it is determined that the order of output is the normal order, whereas the print data is output to the printer in lower-right to left order when it is determined that the order of output is the reverse order.

* * * * *

UNITED STATES PATENT AND TRADEMARK OFFICE
CERTIFICATE OF CORRECTION

PATENT NO.    : 6,507,411 B1
DATED         : January 14, 2003
INVENTOR(S)   : Nishikawa et al.

It is certified that error appears in the above-identified patent and that said Letters Patent is hereby corrected as shown below:

Title page,
Item [30], Foreign Application Priority Data,
"Oct. 7, 1998   (JP) ……………….. 10-196338" should read
-- Jul. 10, 1998  (JP) ……………….. 10-196338 --.

Column 10,
Line 60, "as step 17.4" should read -- at step 17.4. --.

Column 13,
Line 8, "be" should read -- to be --.

Column 15,
Line 10, "19.2" should read -- 19.2. --; and
Line 53, "MPU)." should read -- MPU) --.

Column 17,
Lines 19 and 23, "page" should read -- pages --.

Column 18,
Lines 29 and 32, "page" should read -- pages --; and
Line 50, "apparatus" should read -- method --, Column 19,
Line 18, "image." should read -- images. --.

UNITED STATES PATENT AND TRADEMARK OFFICE
CERTIFICATE OF CORRECTION

PATENT NO. : 6,507,411 B1
DATED : January 14, 2003
INVENTOR(S) : Nishikawa et al.

It is certified that error appears in the above-identified patent and that said Letters Patent is hereby corrected as shown below:

Column 20,
Line 3, "apparatus" should read -- program --;
Line 5, "page" should read -- pages --;
Line 7, "apparatus" should read -- program --; and
Line 8, "page" should read -- pages --.

Signed and Sealed this

Sixth Day of January 2004

JAMES E. ROGAN
*Director of the United States Patent and Trademark Office*